United States Patent
Watanabe

(10) Patent No.: US 12,452,808 B2
(45) Date of Patent: Oct. 21, 2025

(54) NODE APPARATUS, SYSTEM, METHOD OF CONTROLLING THE NODE APPARATUS, METHOD OF CONTROLLING THE SYSTEM, METHOD OF MANUFACTURING PRODUCTS, AND RECORDING MEDIUM

(71) Applicant: CANON KABUSHIKI KAISHA, Tokyo (JP)

(72) Inventor: Kento Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 403 days.

(21) Appl. No.: 18/161,201

(22) Filed: Jan. 30, 2023

(65) Prior Publication Data

US 2023/0262623 A1    Aug. 17, 2023

(30) Foreign Application Priority Data

Feb. 16, 2022  (JP) .................................. 2022-021819

(51) Int. Cl.
*H04W 56/00* (2009.01)
(52) U.S. Cl.
CPC ................................ *H04W 56/001* (2013.01)
(58) Field of Classification Search
CPC . H04W 56/001; Y02D 30/70; G05B 19/4185; G05B 2219/33139
See application file for complete search history.

(56) References Cited

U.S. PATENT DOCUMENTS

| | | | |
|---|---|---|---|
| 2015/0146614 A1* | 5/2015 | Yu | H04W 76/28 370/328 |
| 2021/0293585 A1 | 9/2021 | Watanabe | |
| 2022/0124123 A1 | 4/2022 | Watanabe | |

FOREIGN PATENT DOCUMENTS

| | | |
|---|---|---|
| JP | 2008-306472 | 12/2008 |
| JP | 2009-531973 | 9/2009 |
| JP | 2011-24013 | 2/2011 |
| JP | 2015-203926 | 11/2015 |
| JP | 2017-60156 | 3/2017 |
| WO | 2020/149103 | 7/2020 |

* cited by examiner

*Primary Examiner* — Kyaw Z Soe
(74) *Attorney, Agent, or Firm* — Venable LLP

(57) ABSTRACT

A node apparatus configured to be connected with a sensor includes a communication portion and a control portion. The communication portion is configured to communicate with a gateway apparatus. The control portion is configured to execute a first task in which the control portion transmits data obtained from the sensor, to the gateway apparatus by using the communication portion, and a second task in which the control portion transmits information on synchronization with the gateway apparatus, to the gateway apparatus by using the communication portion at a timing different from a timing at which the control portion executes the first task.

20 Claims, 23 Drawing Sheets

FIG.6

NODE NUMBER:104

| TASK NUMBER | EVENT TYPE | EVENT CONDITION | SIGNAL INPUT CONDITION | SIGNAL PROCESSING CONDITION | OUTPUT CONDITION |
|---|---|---|---|---|---|
| 0 | SYNCHRO-NIZATION | 12:20 | NODE INFORMATION (HASH VALUE, REMAINING BATTERY LEVEL, INTERNAL TEMPERATURE) | NO OPERATION | WIRELESS (GW) |
| 1 | MEASUREMENT | SIXTY-MINUTE INTERVAL | ch1,54kHz,0~5V, NUMBER OF SAMPLES: 10,000 AMPLIFICATION FACTOR: 50 | ①FFT PROCESS ②PARTIAL OVERALL PROCESS | WIRELESS (GW) |
| 2 | MEASUREMENT | EXTERNAL I/O INTERRUPT | ch2,54kHz,0~5V, NUMBER OF SAMPLES: 10,000 AMPLIFICATION FACTOR: 50 | ①FFT PROCESS | MEMORY |
|  |  |  |  |  |  |

HASH VALUE:4E54

| NODE NUMBER | TASK NUMBER | DATABASE | TABLE |
|---|---|---|---|
| 101 | 0 | DB1 | TBL1 |
| 101 | 1 | DB1 | TBL2 |
| 101 | 2 | DB1 | TBL3 |
| 104 | 0 | DB1 | TBL1 |
| 104 | 1 | DB1 | TBL4 |
|  |  |  |  |

| NODE NUMBER | HASH VALUE |
|---|---|
| 101 | 1A2C |
| 102 | 23E2 |
| 103 | 65AB |
| 104 | 4E54 |
| 105 | EA23 |
|  |  |

FIG.14

| NODE NUMBER | SYNCHRO-NIZATION TIME | RADIO FIELD INTENSITY |
|---|---|---|
| 101 | 12:00 | -52 |
| 102 | 12:05 | -51 |
| 103 | 12:10 | -63 |
| 104 | 12:20 | -72 |
| 105 | 12:40 | -75 |
|  |  |  |

FIG.15

SYNCHRONIZATION SETTING

| OPERATION STATE | SYNCHRONIZATION INTERVAL | |
|---|---|---|
| NORMAL OPERATION | ONCE A DAY (12:00) | CHANGE |
| ADJUSTMENT | TWICE A DAY (12:00, 15:00) | CHANGE |

| BATTERY VOLTAGE | SYNCHRONIZATION INTERVAL | |
|---|---|---|
| 2.3~ | ONCE A DAY | CHANGE |
| ~2.2 | EVERY TWO DAYS | CHANGE |

| RADIO FIELD INTENSITY | MINIMUM INTERVAL | |
|---|---|---|
| ~-60 | 5 MINUTES | CHANGE |
| -61~-70 | 10 MINUTES | CHANGE |
| -71~ | 20 MINUTES | CHANGE |

SAVE   CANCEL

| NODE NUMBER | SYNCHRONIZATION TIME | RADIO FIELD INTENSITY | VOLTAGE | OPERATION STATE |
|---|---|---|---|---|
| 101 | 12:00<br>15:00 | −52 | 3.2 | ADJUSTMENT |
| 102 | 12:05 | −51 | 3.3 | NORMAL OPERATION |
| 103 | 12:10 | −50 | 3.1 | NORMAL OPERATION |
| 104 | 12:20 | −63 | 2.2 | NORMAL OPERATION |
| 105 | 12:30 | −68 | 3.1 | NORMAL OPERATION |
|  |  |  |  |  |

NODE APPARATUS, SYSTEM, METHOD OF CONTROLLING THE NODE APPARATUS, METHOD OF CONTROLLING THE SYSTEM, METHOD OF MANUFACTURING PRODUCTS, AND RECORDING MEDIUM

BACKGROUND OF THE INVENTION

Field of the Invention

The present invention relates to a node apparatus and the like used for obtaining information on the state of a production facility, for example.

Description of the Related Art

In general, it has been difficult to find an abnormal state of a production facility even if the production facility deviates from the normal state (in which the production facility is expected to work), as long as the abnormal state does not hinder the operation of the production facility. For this reason, preventive maintenance is performed; and in the preventive maintenance, inspection, repair, and component replacement are performed periodically. However, the preventive maintenance has a problem that involves the regular inspection and its man-hours.

As a trial for countermeasures to such a problem, sensors are disposed in a production facility, and the state of the production facility is determined by collecting and analyzing the measurement data. The component replacement, repair, and update are performed, if necessarily, in accordance with the state of the production facility for reducing unnecessary component replacement and labor costs. For example, in an information processing system, a node apparatus that includes a communication unit transmits measurement data measured by the sensors, to a gateway apparatus; the gateway apparatus receives the measurement data sent from the node apparatus, and stores the measurement data in a database; and a computer analyzes the measurement data stored in the database.

For appropriately operating such an information processing system, it is necessary to use not only the one-way communication in which the node apparatus transmits the measurement data to the gateway apparatus, but also the bidirectional communication in which the information is exchanged between the node apparatus and the gateway apparatus. However, if the standby state of the node apparatus is kept by keeping the on-state of the receiver of the node apparatus for enabling the bidirectional communication, the power consumption of the node apparatus will increase.

Japanese Patent Application Publication No. 2015-203926 describes a communication method. In this method, the node apparatus is allowed to receive the information from the gateway apparatus in a predetermined period of time after the node apparatus transmits data to the gateway apparatus. In the communication method described in Japanese Patent Application Publication No. 2015-203926, if the node apparatus receives a data request signal from the gateway apparatus in the predetermined period of time, the node apparatus transmits the data requested by the gateway apparatus, to the gateway apparatus.

SUMMARY OF THE INVENTION

According to a first aspect of the present invention, a node apparatus configured to be connected with a sensor includes a communication portion and a control portion. The communication portion is configured to communicate with a gateway apparatus. The control portion is configured to execute a first task in which the control portion transmits data obtained from the sensor, to the gateway apparatus by using the communication portion, and a second task in which the control portion transmits information on synchronization with the gateway apparatus, to the gateway apparatus by using the communication portion at a timing different from a timing at which the control portion executes the first task.

According to a second aspect of the present invention, a node apparatus is configured to be connected with a sensor. The node apparatus includes a communication portion configured to communicate with a gateway apparatus, and a control portion. A method of controlling the node apparatus includes executing, by the control portion, a first task in which the control portion transmits data obtained from the sensor, to the gateway apparatus by using the communication portion, and executing, by the control portion, a second task in which the control portion transmits information on synchronization with the gateway apparatus, to the gateway apparatus by using the communication portion at a timing different from a timing at which the control portion executes the first task.

Further features of the present invention will become apparent from the following description of exemplary embodiments with reference to the attached drawings.

BRIEF DESCRIPTION OF THE DRAWINGS

FIG. 6 is a diagram illustrating a task table stored in the node apparatus.

FIG. 7 is a diagram illustrating a table index stored in the gateway apparatus.

FIG. 8 is a diagram illustrating a node hash-value table stored in the gateway apparatus.

FIG. 14 is a diagram illustrating a synchronization-time table stored in the gateway apparatus of the second embodiment.

FIG. 15 is a diagram illustrating a synchronization setting screen displayed on a display screen when a management apparatus of the second embodiment executes an application.

FIG. 22 is a diagram illustrating a synchronization-time table stored in the gateway apparatus of the sixth embodiment.

DESCRIPTION OF THE EMBODIMENTS

Figure 1:
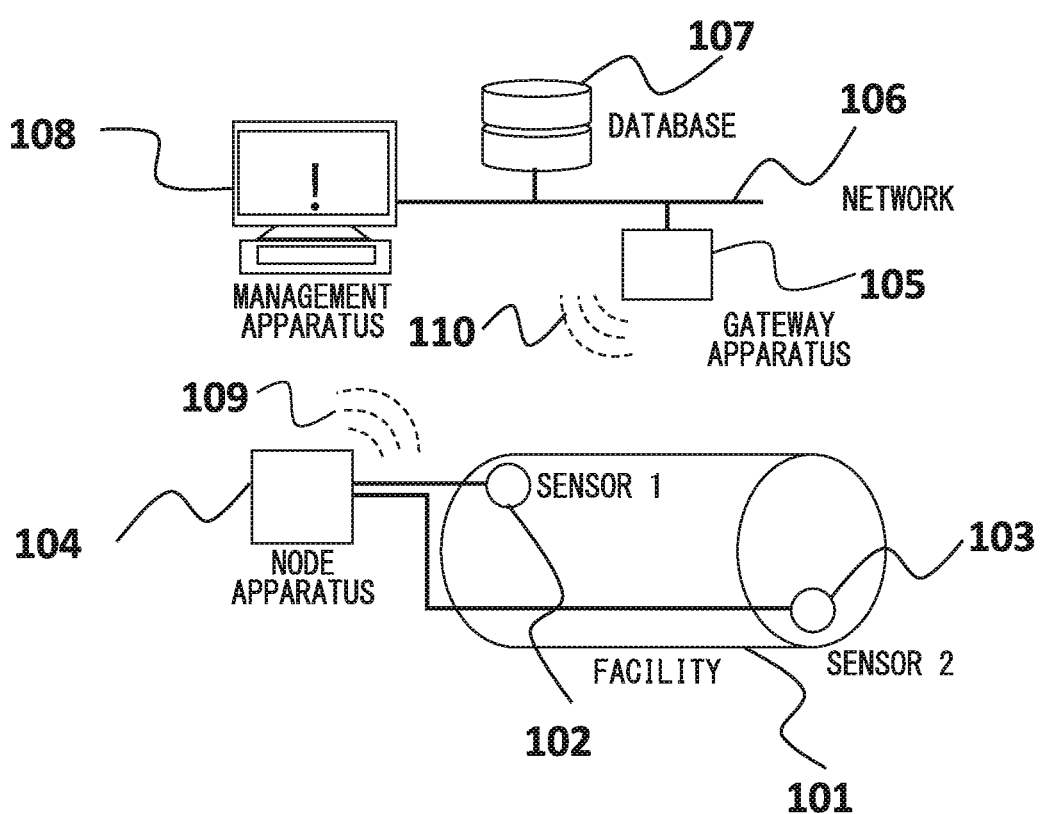
FIG. 1 is a schematic diagram of a production facility to which an information processing system of a first embodiment is applied.

The method described in Japanese Patent Application Publication No. 2015-203926 can reduce the power consumption of the node apparatus, compared with the method that keeps the on-state of the receiver of the node apparatus. However, if the node apparatus frequently transmits data to the gateway apparatus, a total time of standby operations of the node apparatus will increase accordingly. Thus, in the method described in Japanese Patent Application Publication No. 2015-203926, if the number of data requests from the gateway apparatus is smaller than the number of data transmissions from the node apparatus to the gateway apparatus, the node apparatus highly likely performs unnecessary standby operations.

For this reason, it has been desired to achieve a technique that makes the power consumption of the node apparatus lower than that by the conventional method, in a configuration that enables the node apparatus to transmit data to the gateway apparatus, and that enables the bidirectional communication of information between the node apparatus and the gateway apparatus.

Hereinafter, a node apparatus, a system, and the like of an embodiment of the present invention will be described with reference to the accompanying drawings.

Note that since the embodiments described below are examples, a detailed configuration and the like may be modified as appropriate by a person skilled in the art without departing the spirit of the present invention. In addition, in the figures which will be referred to in the following embodiments and examples, a component given an identical reference numeral has an identical function, unless otherwise specified.

For example, an event that requires a node apparatus and a gateway apparatus to perform the bilateral communication of information is a synchronization between the node apparatus and the gateway apparatus. Specifically, the communication of information is performed, for example, when the clock of the node apparatus and the clock of the gateway apparatus are synchronized with each other or when the change in setting of the node apparatus for collecting and transmitting measurement data is shared by the node apparatus and the gateway apparatus. The synchronizing of the clocks may be referred to as time synchronization, and the communication of information for sharing the change in setting may be referred to as setting synchronization. Hereinafter, apart from the one-way communication in which the node apparatus transmits data to the gateway apparatus, embodiments of communication of information on the synchronization between the node apparatus and the gateway apparatus will be described.

First Embodiment

Information Processing System

FIG. 1 is a schematic diagram of a production facility to which an information processing system of an embodiment of the present invention is applied. A production facility 101 includes sensors 102 and 103 used for obtaining the state of the production facility 101. Each of the sensors 102 and 103 may be a vibration sensor, an acceleration sensor, a pressure sensor, a photosensor, a torque sensor, or a temperature sensor; and measures the state of the production facility 101 and quantifies the state as a physical quantity. Thus, the production facility 101 is an information processing system or a production system that monitors the production facility 101 by obtaining the state of the production facility 101 by using the sensors 102 and 103.

For obtaining the state of the production facility 101, a node apparatus 104 can be connected with one or more of the sensors 102 and 103. The sensors 102 and 103 may be included in the node apparatus 104. The node apparatus 104 is one or more in number, determined as necessary; and is disposed in the production facility 101. The node apparatus 104 includes a communication unit 109, and a gateway apparatus 105 includes a communication unit 110, so that the node apparatus 104 and the gateway apparatus 105 can communicate with each other. Each of the communication units 109 and 110 includes one or more communication portions, selected appropriately from wireless communications including low power wide area (LPWA) and wireless LAN, and wire communications including Ethernet and Field Level Network.

The measurement data measured by using the sensors is sent from the node apparatus 104 to the gateway apparatus 105 via the communication units 109 and 110, and collected in the gateway apparatus 105. The gateway apparatus 105 is connected to a network 106. Note that the network 106 may be a dedicated network used in a plant, or may be a wide area network such as the Internet. The gateway apparatus 105 is installed in an area in which the gateway apparatus 105 can communicate with the node apparatus 104 via the communication units 109 and 110.

The measurement data collected in the gateway apparatus 105 is stored in a database 107 of a data storage device connected to the network 106. Note that part of the function of the gateway apparatus 105 may be implemented as software in the database 107 or a storage portion of a computer. In addition, the database 107 may be a storage device or a storage medium.

An administrator can check resultant data stored in the database 107, by using a management apparatus 108 that includes a computer. The management apparatus 108 can analyze the state of the production facility 101 by performing various processes by using the measurement data stored in the database 107. If the management apparatus 108 detects that an abnormal state has occurred in the production facility 101, the management apparatus 108 may notify the administrator of the abnormal state by issuing an alert or sending a mail to the administrator, if necessary.

Configuration of Node Apparatus

Figure 2:
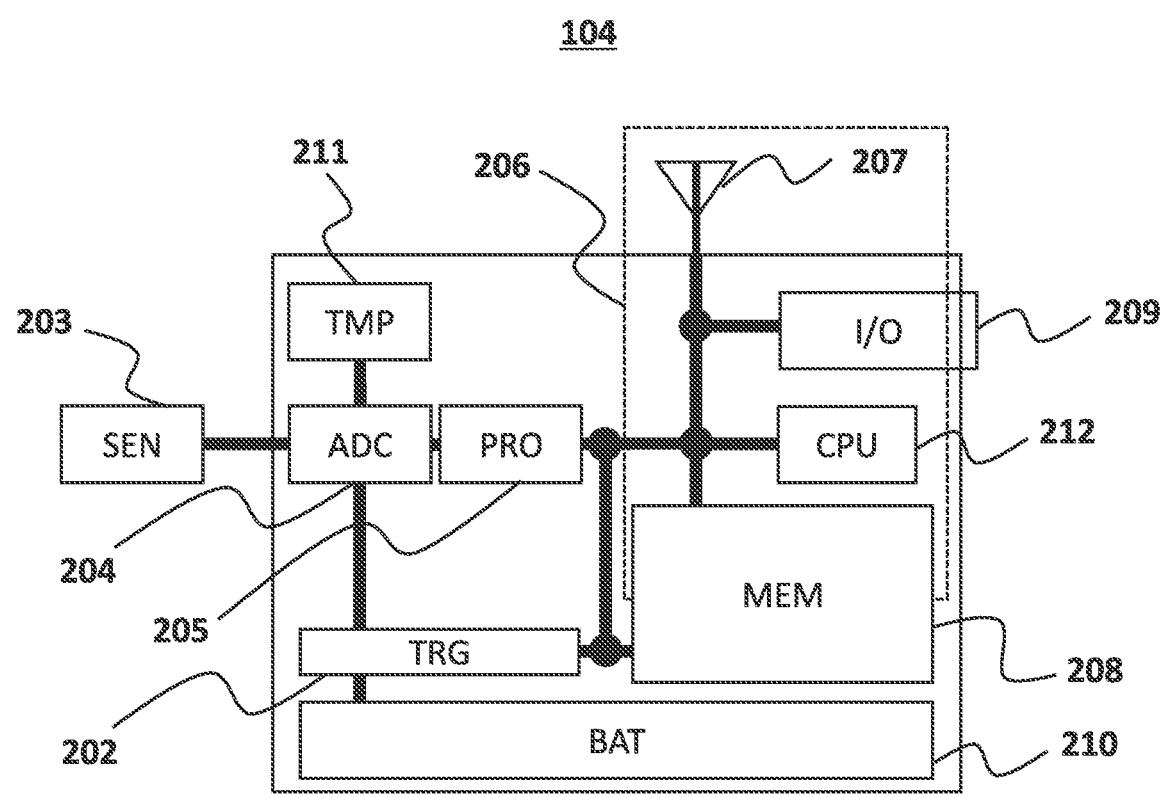
FIG. 2 is a schematic diagram illustrating a block configuration of a node apparatus of the first embodiment.

FIG. 2 is a schematic diagram illustrating a block configuration of the node apparatus 104 illustrated in FIG. 1. Note that in FIG. 2, the function blocks represent functional elements that are necessary for describing features of the present embodiment. Thus, other function blocks that are commonly used and that are not directly related to the principle of the present invention for solving the problem are not illustrated. In addition, since the functional elements of FIG. 2 are illustrated conceptually so that the functions of the elements can be understood, the elements may not necessarily be connected with each other physically as illustrated in FIG. 2. For example, a specific configuration in which functional blocks are distributed or unified is not limited to the example illustrated in the figure, and part or all of the functional blocks may be functionally or physically distributed or unified in a predetermined unit, in accordance with a use state or the like. In addition, each functional block can be achieved by using hardware or software. That is, part of the function blocks can be achieved by a CPU 212, which serves as a control portion, reading and executing a control program stored, for example, in a storage device or a non-transitory recording medium. In another case, part or all of the function blocks may be executed by a hardware component such as an ASIC.

The node apparatus 104 includes the CPU 212 that controls the whole operation sequence and the execution of a task. The CPU 212 reads a control program and control information from a storage portion 208 or a computer-readable recording medium (not illustrated), and executes the control program. The recording medium used may be a ROM, a flexible disk, an optical disk, a magneto-optical disk, a magnetic tape, a nonvolatile memory such as a USB memory, an SSD, or the like.

The node apparatus 104 is connected with one or more sensors 203 disposed in the production facility 101. The node apparatus 104 includes a signal input portion 204 that converts analog signals outputted from the sensors 203, to digital signals. The signal input portion 204 includes an A/D converter that converts one or more analog input signals to digital signals. Note that the signal input portion 204 may be included in the sensor 203, and the sensor 203 may output the digital signal.

The node apparatus 104 also includes a battery 210 that serves as a driving power source, and a temperature sensor 211 that measures the temperature of the interior of the node apparatus 104. The battery 210 may be a primary battery, a secondary battery, or a capacitor that stores generated electric energy. In addition, the battery 210 includes a sensor used for monitoring the remaining battery level. The output signals from the sensor of the battery 210 and the temperature sensor 211 are processed, if necessary, in the signal input portion 204 and a processing portion 205; and are stored in the storage portion 208 or transmitted from an input/output portion 206 to an external apparatus.

The signal digitized by the signal input portion 204 is processed, if necessary, by the processing portion 205. The processing portion 205 combines one or more of the following processes, determines the order of the processes, and executes them. The following processes are as follows: no operation, an FFT process, a partial overall process, an envelope process, a frequency filter process, a differential process, an integral process, a wavelet process, an average value process, a standard deviation process, a maximum value process, a minimum value process, a peak-to-peak process, a peak hold process, an effective value process, a crest factor process, a form factor process, an impulse coefficient process, a margin coefficient process, and a machine-learning-model inference process.

For example, in the no operation, the processing portion 205 performs no operation on the digitized input signal, and delivers the digitized signal to the input/output portion 206. In the FFT process, the processing portion 205 decomposes the digitized input signal into frequency components. In the partial overall process, the processing portion 205 determines a frequency range, and sums the FFT-processed frequency components in the determined frequency range. In the envelope process, the processing portion 205 performs an envelope process on the input signal. In the frequency filter process, the processing portion 205 sets a frequency, and causes the input signal to pass through a low-pass filter, a high-pass filter, or a band-pass filter for eliminating undesired signals and obtaining an intended signal.

In the differential process, the processing portion 205 differentiates the input signal. In the integral process, the processing portion 205 integrates the input signal. In the wavelet process, the processing portion 205 decomposes the digitized input signal into frequency components and time components. In the average value process, the processing portion 205 calculates an average value of the input signal. In the standard deviation process, the processing portion 205 calculates a standard deviation of the input signal. In the maximum value process, the processing portion 205 calculates a maximum value of the input signal. In the minimum value process, the processing portion 205 calculates a minimum value of the input signal. In the peak-to-peak process, the processing portion 205 calculates a difference between the maximum value and the minimum value of the input signal. In the peak hold process, the processing portion 205 measures the input signal continuously in a predetermined period of time, and calculates a maximum value of the input signal in the predetermined period of time. In the effective value process, the processing portion 205 calculates an effective value of the input signal.

In the crest factor process, the processing portion 205 calculates a crest factor of the input signal by dividing a maximum value of the input signal by an effective value of the input signal. In the form factor process, the processing portion 205 calculates a form factor of the input signal by dividing an effective value of the input signal by an average value of the input signal. In the impulse coefficient process, the processing portion 205 calculates an impulse coefficient of the input signal by dividing a maximum value of the input signal by an absolute average value of the input signal. In the margin coefficient process, the processing portion 205 calculates a margin coefficient of the input signal by dividing a maximum value of the input signal by a value of the input signal. The value is obtained by calculating a square root of an average value of the input signal, and then calculating a square of the square root value. In the machine-learning-model inference process, a computer creates a machine learning model in advance by reading and analyzing learning data. In the machine learning model, rules for classification and identification are defined. The machine learning model is implemented in the node apparatus 104, and the processing portion 205 determines the output depending on the input signal and the machine learning model.

Note that although the above-described various types of signal processing are performed by the processing portion 205, they may be performed, if necessary, by a dedicated piece of hardware such as a PLA.

The node apparatus 104 also includes the input/output portion 206 that sends/receives information to/from an external apparatus. The node apparatus 104 outputs a signal or data, which has been processed by the processing portion 205 or the like, to an external apparatus via the input/output portion 206. In addition, the node apparatus 104 sends/receives information on the synchronization, to/from the gateway apparatus 105. The input/output portion 206 operates with, for example, the processing portion 205 under the control performed by the CPU 212. The input/output portion 206 includes a wireless-communication unit (communication portion) 207 that corresponds to the communication unit 109 illustrated in FIG. 1. Preferably, the input/output portion 206 further includes a general-purpose input/output portion 209 that allows the node apparatus 104 to communicate with a network or an external apparatus via wire.

The input/output portion 206 sends/receives information to/from the storage portion 208. For example, the node apparatus 104 associates the measurement data outputted from the processing portion 205, with a node number (i.e., node identification information) and a measurement task number (i.e., task identification information); and temporarily stores the measurement data associated with the node number and the measurement task number, in the storage portion 208. The node number serves as identification information for identifying the node apparatus 104 as an individual apparatus. Then, the input/output portion 206 reads the information from the storage portion 208, and transmits the information to the gateway apparatus 105 via the wireless-communication unit 207. In another case, the input/output portion 206 receives the information on the synchronization, such as parameter values of a task table, from the gateway apparatus 105 via the wireless-communication unit 207, and stores the information in the storage portion 208.

The node apparatus 104 also includes an event generation portion 202. The event generation portion 202 generates a trigger event that starts a corresponding one of various tasks, such as a measurement task and a synchronization task. In the measurement task, the node apparatus 104 performs the measurement by using the sensor 203, and transmits the measurement data to the gateway apparatus 105. In the synchronization task, the node apparatus 104 sends/receives the information on the synchronization, to/from the gateway apparatus 105. The event generation portion 202 autonomously generates a trigger event, for example, at predetermined time intervals in accordance with the type of a task; or generates a trigger event, if necessary, depending on the information sent from an external apparatus via the input/output portion 206. The event generation portion 202 generates a trigger event, for example, at time intervals, at a specified time, at a time when a trigger input signal is sent from an external apparatus, at a time when the state of the node apparatus, such as the state on the temperature or the state on the remaining battery level, changes, at a time when the task is called from another task in the node, at a time when the node apparatus is called from the gateway apparatus, or at a time when the node apparatus is called from another node apparatus. The event generation portion 202 may be a dedicated piece of hardware such as a PLA, or may be a piece of software that is a control program for controlling the operation of the CPU 212.

For example, when the measurement task is executed at predetermined time intervals, the event generation portion 202 checks a value of an internal timer, and generates a trigger event (i.e., a trigger signal) that causes the CPU 212 to start the measurement task. In addition, when the synchronization task, in which the internal timer of the node apparatus and the internal timer of the gateway apparatus are synchronized with each other, is executed, the event generation portion 202 generates a trigger event (i.e., a trigger signal) at time intervals longer than the time intervals of the measurement task. In general, the timer of the node apparatus loses the synchronization with the timer of the gateway apparatus in a period of time longer than the interval at which the measurement task is executed. Thus, by making the interval of the synchronization task longer, the consumption of the battery 210 of the node apparatus can be reduced.

For example, when the measurement task is executed at a specified time, the event generation portion 202 checks a value of the internal timer, and generates a trigger event (i.e., a trigger signal) that causes the CPU 212 to start the measurement task. In addition, when the synchronization task, in which the internal clock of the node apparatus and the internal clock of the gateway apparatus are synchronized with each other, is executed, the event generation portion 202 generates a trigger event (i.e., a trigger signal) at a time preceding the specified time, at which the measurement task is executed, by a predetermined time. With this operation, it is ensured that the measurement task is executed at the specified time, and that the synchronization task is executed only when needed. As a result, the consumption of the battery 210 of the node apparatus can be reduced.

For example, when the execution of a task is controlled in accordance with the internal temperature of the node apparatus or the remaining battery level, the event generation portion 202 generates a trigger event (i.e., a trigger signal) in accordance with a measurement value from the temperature sensor 211 or a remaining battery level of the battery 210. Since the execution of a task, such as the synchronization task, is controlled in accordance with the state of the node apparatus, the consumption of the battery 210 can be reduce while the stable operation of the node apparatus is ensured.

The event generation condition of the event generation portion 202, the signal input condition of the signal input portion 204, the signal processing condition of the processing portion 205, and the input/output condition of the input/output portion 206 are stored in a task table, which is stored in the storage portion 208. Note that the task table may be stored not in the storage portion 208, but in another storage device.

Configuration of Gateway Apparatus

Figure 3:
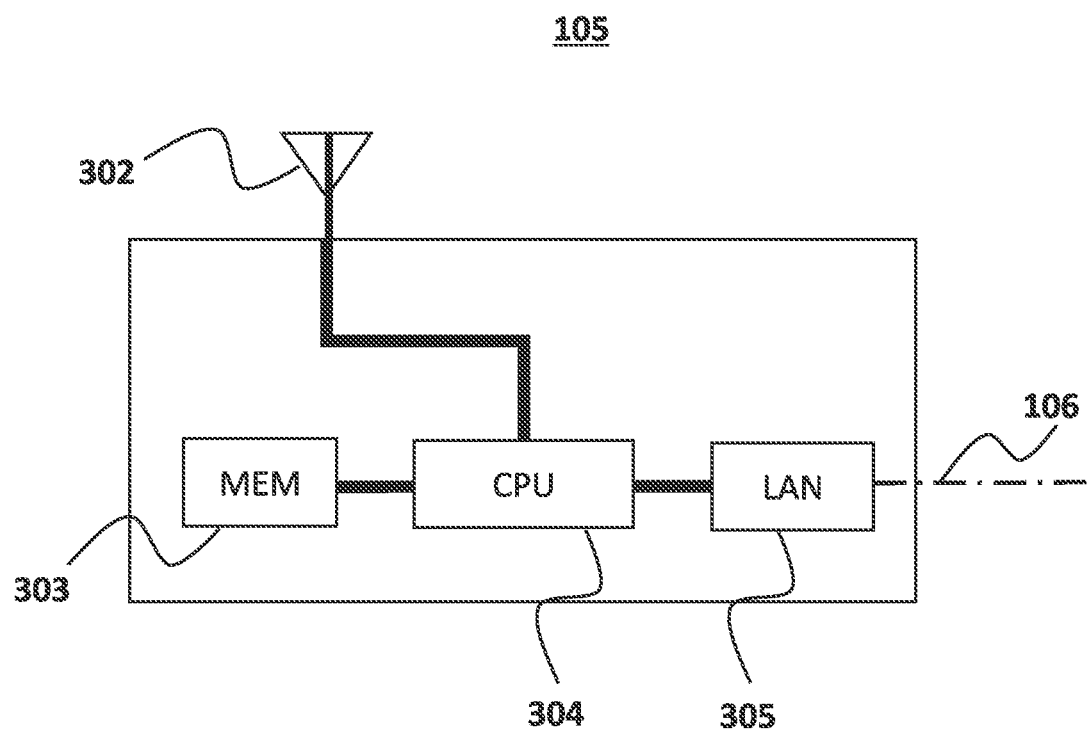
FIG. 3 is a schematic diagram illustrating a block configuration of a gateway apparatus of the first embodiment.

FIG. 3 is a schematic diagram illustrating a block configuration of the gateway apparatus 105 illustrated in FIG. 1. Note that in FIG. 3, the function blocks represent functional elements that are necessary for describing features of the present embodiment. Thus, other function blocks that are commonly used and that are not directly related to the principle of the present invention for solving the problem are not illustrated. In addition, since the functional elements of FIG. 3 are illustrated conceptually so that the functions of the elements can be understood, the elements may not necessarily be connected with each other physically as illustrated in FIG. 3. For example, a specific configuration in which functional blocks are distributed or unified is not limited to the example illustrated in the figure, and part or all of the functional blocks may be functionally or physically distributed or unified in a predetermined unit, in accordance with a use state or the like. In addition, each functional block can be achieved by using hardware or software. That is, part of the function blocks can be achieved by a CPU 304 reading and executing a control program stored, for example, in a storage device or a non-transitory recording medium. In another case, part or all of the function blocks may be executed by a hardware component such as an ASIC.

The gateway apparatus 105 includes the CPU 304 that controls the whole operation sequence and the execution of a task. The CPU 304 reads a control program and control information from a storage device 303 or a computer-readable recording medium (not illustrated), and executes the control program. The recording medium used may be a ROM, a flexible disk, an optical disk, a magneto-optical disk, a magnetic tape, a nonvolatile memory such as a USB memory, an SSD, or the like.

The gateway apparatus 105 includes a wireless-communication unit 302 that corresponds to the communication unit 110 illustrated in FIG. 1, and communicates with the node apparatus 104. The gateway apparatus 105 processes the measurement data sent from the node apparatus, by using a table index stored in the storage device 303. The table index contains information that represents the relationship between a node number, a task number, and a table stored in the database 107. The node number is a number for identifying a node apparatus that exists in the information processing system; the task number is a number for identifying a measurement task; and the table stored in the database 107 is a table in which the measurement data obtained in the measurement task is to be stored.

When the gateway apparatus 105 receives the measurement data, to which the node number and the task number has been added, from the node apparatus via the wireless-communication unit 302, the gateway apparatus 105 refers to the table index, and determines a table which is stored in the database 107 and in which the measurement data is to be stored. Then the gateway apparatus 105 connects to the network 106 via the wire-communication unit 305, and stores the measurement data in a predetermined table stored in the database 107.

Operation Sequence of Node Apparatus

Figure 4:
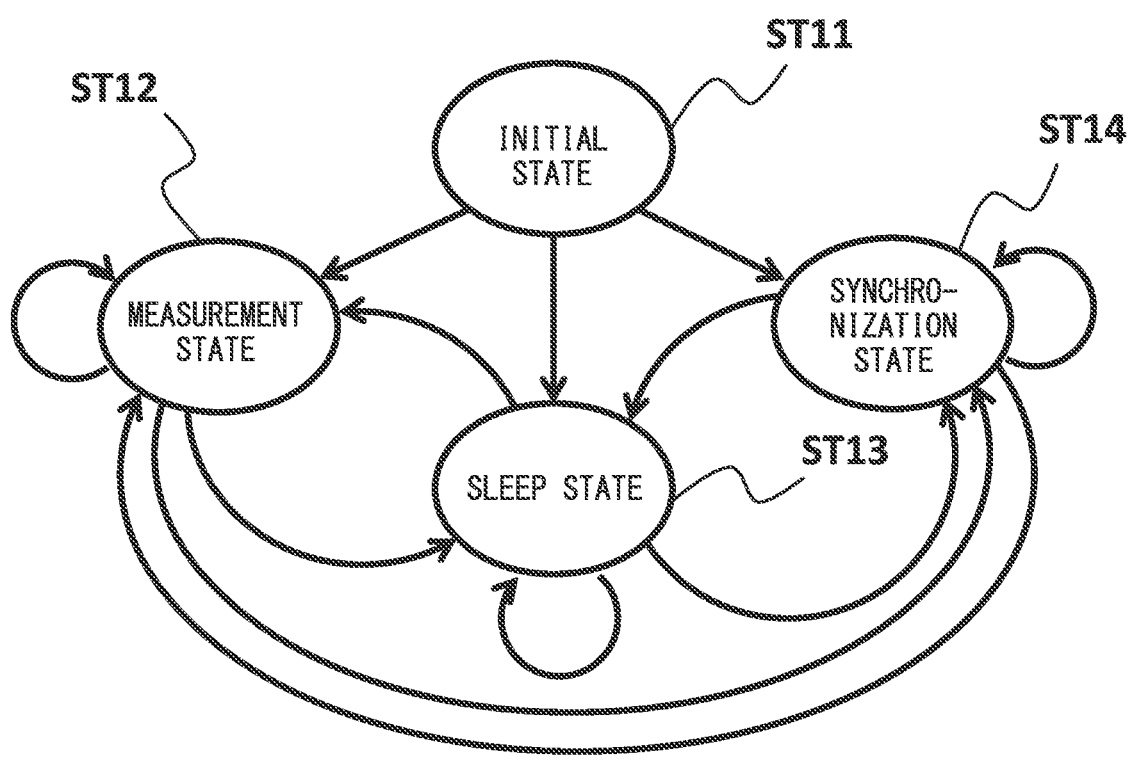
FIG. 4 is a state transition diagram illustrating an operation sequence of the node apparatus of the first embodiment.

FIG. 4 is a state transition diagram illustrating an operation sequence of the node apparatus 104. When the power is turned on, the node apparatus 104 enters a state ST11, and performs the initialization and reads setting information from the storage portion 208. The node apparatus 104 transitions to a state ST12 if a measurement event that serves as a first task occurs after the node apparatus 104 enters the state ST11, or transitions to a state ST14 if a synchronization event that serves as a second task occurs. If the measurement event (first task) and the synchronization event (second task) do not occur, the node apparatus 104 transitions to a state ST13, and enters a sleep state in which the communication portion is suspended. In the synchronization event that serves as the second task, the node apparatus 104 transmits the information to the gateway apparatus, and ends the synchronization task after a predetermined time has elapsed or when the node apparatus 104 receives a signal that notifies the node apparatus 104 of the end of the synchronization task, from the gateway apparatus.

If a measurement event occurs in the state ST13 that is a sleep state, the node apparatus 104 transitions to the state ST12 that is a measurement state. If the synchronization event does not occur after the completion of measurement, the node apparatus 104 transitions to the state ST13 that is a sleep state. If the synchronization event occurs after the completion of measurement, the node apparatus 104 transitions to the state ST14 that is a synchronization state. If the synchronization event occurs in the state ST13 that is a sleep state, the node apparatus 104 transitions to the state ST14 that is a synchronization state. If the measurement event does not occur after the completion of synchronization, the node apparatus 104 transitions to the state ST13 that is a sleep state. If the measurement event occurs after the completion of synchronization, the node apparatus 104 transitions to the state ST12. If both of the measurement event and the synchronization event occur in the state ST13 that is a sleep state, the node apparatus 104 first transitions to the measurement state (i.e., the state ST12), and then transitions to the state ST14 that is a synchronization state, after the completion of measurement.

Operation Sequence of Gateway Apparatus

Figure 5:
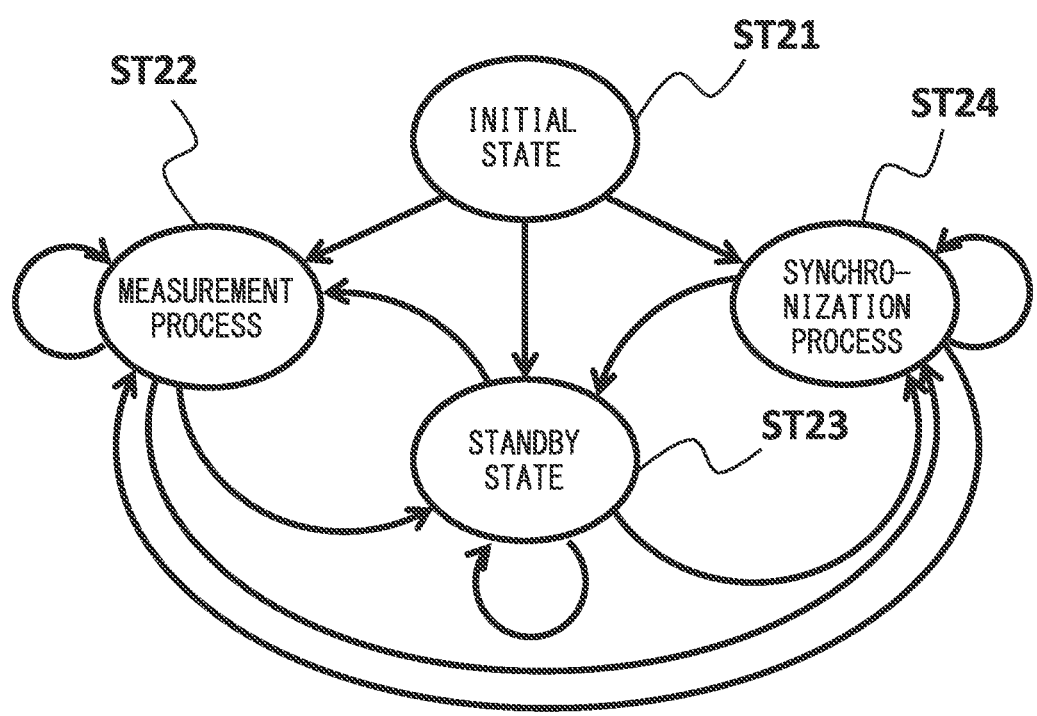
FIG. 5 is a state transition diagram illustrating an operation sequence of the gateway apparatus of the first embodiment.

FIG. 5 is a state transition diagram illustrating an operation sequence of the gateway apparatus 105. When the power is turned on, the gateway apparatus 105 enters a state ST21, and performs the initialization and reads setting information from the storage device 303. If the wireless-communication unit 302 receives the measurement data from the node apparatus after the gateway apparatus 105 enters the state ST21, the gateway apparatus 105 transitions to a measurement process (state ST22). If the wireless-communication unit 302 receives the synchronization data from the node apparatus 104 after the state ST21, the gateway apparatus 105 transitions to a synchronization process (state ST24). If the wireless-communication unit 302 does not receive any data, the gateway apparatus 105 transitions to a state ST23 that is a standby state. If the wireless-communication unit 302 receives the measurement data from the node apparatus in the state ST23 that is a standby state, the gateway apparatus 105 transitions to the measurement process (state ST22). If the wireless-communication unit 302 receives the synchronization data from the node apparatus in the state ST23 that is a standby state, the gateway apparatus 105 transitions to the synchronization process (state ST24). If the wireless-communication unit 302 receives the synchronization data from the node apparatus 104 after the completion of the measurement process (state ST22), the gateway apparatus 105 transitions to the synchronization process (state ST24). If the wireless-communication unit 302 receives the measurement data from the node apparatus after the completion of the synchronization process (state ST24), the gateway apparatus 105 transitions to the measurement process (state ST22).

Task Table Included in Node Apparatus

FIG. 6 illustrates a task table 601 stored in the storage portion 208 of the node apparatus 104. The task table 601 includes a task number 602 assigned to a corresponding task, an event type 603, an event condition 604 of the event generation portion 202, a signal input condition 605 of the signal input portion 204, a signal processing condition 606 of the processing portion 205, and an output condition 607 of the input/output portion 206. The event type 603 is used for determining which of the measurement event and the synchronization event the task is. The task table 601 is associated with a node number 608 and a hash value 609, and stored in the storage portion 208. The node number 608 is used for identifying the node apparatus that stores the task table 601, and the hash value 609 is a unique number for identifying the task table 601. In the task table 601 of the node apparatus 104, one or more tasks are registered in advance in accordance with objects to be monitored and sensors connected to the node apparatus 104. The tasks in the task table 601 are executed sequentially such that if an event condition 604 has been satisfied, a corresponding task is executed accordingly. The task whose event condition 604 has been satisfied is executed under the signal input condition 605, the signal processing condition 606, and the output condition 607. Note that FIG. 6 illustrates not only the contents of the task table 601 stored in the storage portion 208, but also a configuration of a displayed image created when the task table 601 is displayed on the screen of a display device.

Table Index Included in Gateway Apparatus

FIG. 7 illustrates a table index 701 stored in the storage device 303 of the gateway apparatus 105. The table index 701 includes a node number 702 of the node apparatus 104, a task number 703, a database 704, and a table 705. The task number 703 corresponds to the task number 602 contained in the task table 601 of the node apparatus 104. The database 704 indicates a database in which the measurement data, which the gateway apparatus 105 has received, is to be stored. The table 705 is an area of the database, in which the measurement data is to be stored. The gateway apparatus 105 registers the table index 701 in the storage device 303, in advance. The table index 701 corresponds to the task table 601 included in each node apparatus 104, which can communicate with the gateway apparatus 105. Upon receiving the measurement data from the node apparatus 104, the gateway apparatus 105 searches the node number 702 and the task number 703, stored in the table index 701, for a node number and a task number sent together with the measurement data. If the gateway apparatus 105 finds the node number and the task number, received by the gateway apparatus 105, in the node number 702 and the task number 703 in the table index 701, the gateway apparatus 105 stores the measurement data in an area indicated by the database 704 and the table 705. Note that FIG. 7 illustrates not only the contents of the table index 701 stored in the storage device 303, but also a configuration of a displayed image created when the table index 701 is displayed on the screen of a display device.

Node Hash-Value Table Included in Gateway Apparatus

FIG. 8 illustrates a node hash-value table 801 stored in the storage device 303 of the gateway apparatus 105. The storage device 303 of the gateway apparatus 105 stores the task table 601 of each node apparatus 104, which can communicate with the gateway apparatus 105, and the node hash-value table 801. The node hash-value table 801 contains a node number 802 and a hash value 803. The node number 802 corresponds to the node number 608 illustrated in FIG. 6, and the hash value 803 corresponds to the hash value 609 illustrated in FIG. 6. These pieces of information are registered in the gateway apparatus 105 by the management apparatus 108 when the management apparatus 108 converts the information on the task table 601 of each node, into a hash value. Note that FIG. 8 illustrates not only the contents of the node hash-value table 801 stored in the storage device 303, but also a configuration of a displayed image created when the node hash-value table 801 is displayed on the screen of a display device.

Configuration of Data Transmitted by Node Apparatus

Figure 9A:
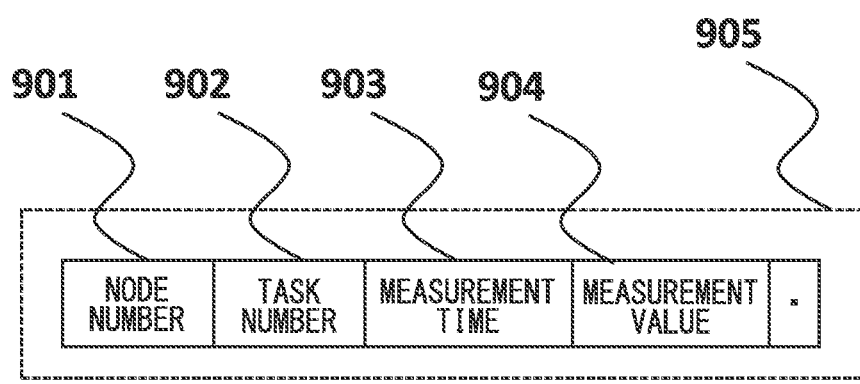
FIG. 9A is a diagram illustrating a configuration of data transmitted from the node apparatus in a measurement task.
Figure 9B:
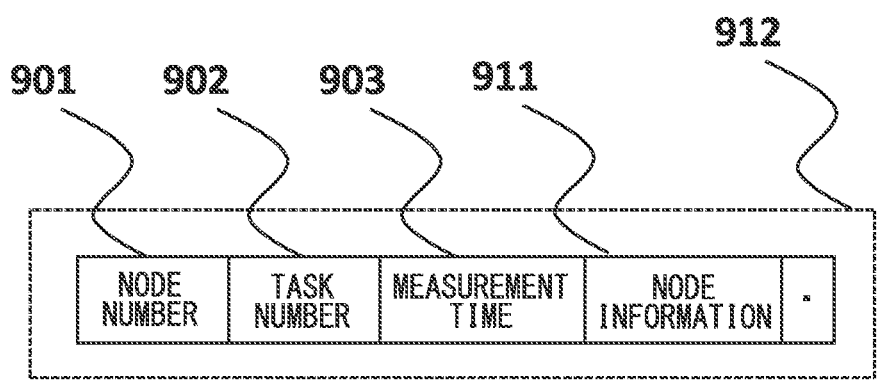
FIG. 9B is a diagram illustrating a configuration of data transmitted from the node apparatus in a synchronization task.

Each of FIGS. 9A and 9B is a schematic diagram illustrating a configuration of data that the node apparatus 104 transmits to the wireless-communication unit 302 of the gateway apparatus 105 by using the wireless-communication unit 207. FIG. 9A illustrates a configuration of data transmitted in the measurement task, and FIG. 9B illustrates a configuration of data transmitted in the synchronization task.

In the measurement task, the node apparatus 104 transmits measurement data 905. The measurement data 905 is a set of a node number 901, a task number 902, a measurement time 903, and a measurement value 904. The node number 901 is used for identifying an individual apparatus, the task number 902 is used for identifying a task, the measurement time 903 is a time at which the measurement was performed by using the sensors. In the synchronization task, the node apparatus 104 transmits synchronization data 912. The synchronization data 912 is a set of a node number 901, a task number 902, a measurement time 903, and node information 911. The node number 901 is used for identifying an individual apparatus, the task number 902 is used for identifying a task, the measurement time 903 is a time at which the temperature measurement using the temperature sensor 211 or the measurement for the remaining battery level of the battery 210 was performed. The node information 911 contains a flag indicating that the task is a synchronization event, an individual apparatus number, a battery voltage, an internal temperature, a hash value of the setting information. Note that in the example of FIGS. 9A and 9B, the measurement data 905 or the synchronization data 912 is transmitted as a single data group. However, the single data group may be divided, if necessary, into pieces of data, and the pieces of data may be transmitted.

Configuration of Data Transmitted by Gateway Apparatus

Figure 10A:
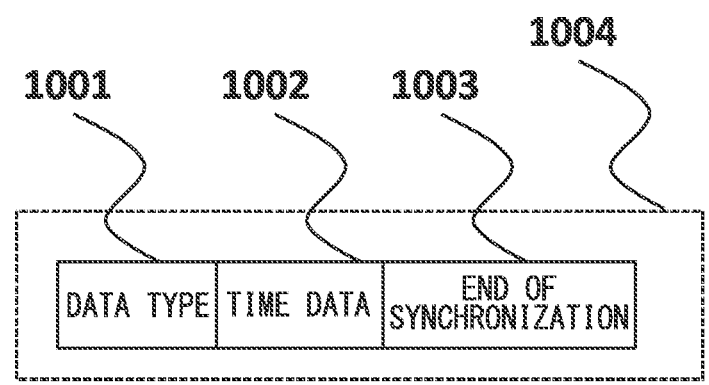
FIG. 10A is a diagram illustrating a configuration of data transmitted from the gateway apparatus when time synchronization is performed.
Figure 10B:
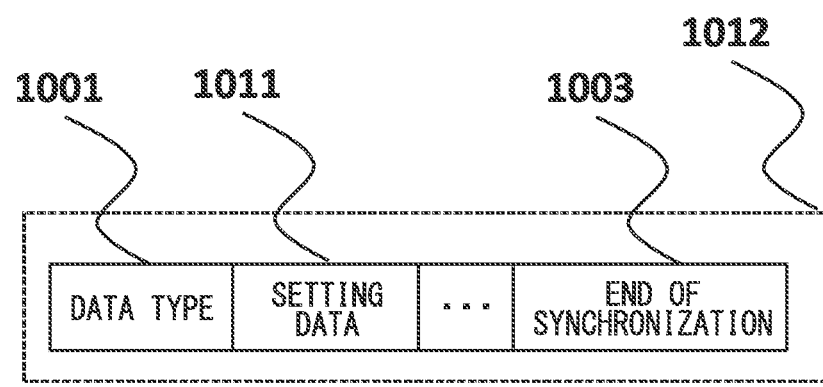
FIG. 10B is a diagram illustrating a configuration of data transmitted from the gateway apparatus when setting synchronization is performed.

Each of FIGS. 10A and 10B is a schematic diagram illustrating a configuration of data that the gateway apparatus 105 transmits to the wireless-communication unit 207 of the node apparatus 104 by using the wireless-communication unit 302. The data transmitted by the gateway apparatus is the information on the synchronization task. FIG. 10A illustrates a configuration of data transmitted when the time synchronization is performed. FIG. 10B illustrates a configuration of data transmitted when the setting synchronization is performed.

In the time synchronization process, when the gateway apparatus 105 receives the synchronization data 912 illustrated in FIG. 9B, from the node apparatus 104, the gateway apparatus 105 transmits the information on the time synchronization, to the node apparatus 104. That is, after the gateway apparatus 105 receives the synchronization data 912 via the wireless-communication unit 302, the gateway apparatus 105 transmits time synchronization data 1004 to the node apparatus via the wireless-communication unit 302. The time synchronization data 1004 is a set of a data type flag 1001, a current time 1002, and a flag 1003. The data type flag 1001 represents a type of the synchronization data, and the flag 1003 indicates the end of the time synchronization process.

In the setting synchronization process, when the gateway apparatus 105 receives the synchronization data 912 illustrated in FIG. 9B, from the node apparatus 104, the gateway apparatus 105 transmits the information on the setting synchronization, to the node apparatus 104. That is, the gateway apparatus 105 transmits setting synchronization data 1012 to the node apparatus via the wireless-communication unit 302. The setting synchronization data 1012 is a set of a data type flag 1001, setting data 1011, and a flag 1003. The data type flag 1001 represents a type of the synchronization data, and the flag 1003 indicates the end of the setting synchronization process. Note that in this example, the time synchronization data 1004 or the setting synchronization data 1012 is transmitted as a single data group. However, the single data group may be divided, if necessary, into pieces of data, and the pieces of data may be transmitted.

Flow of Operations of Node Apparatus

Figure 11:
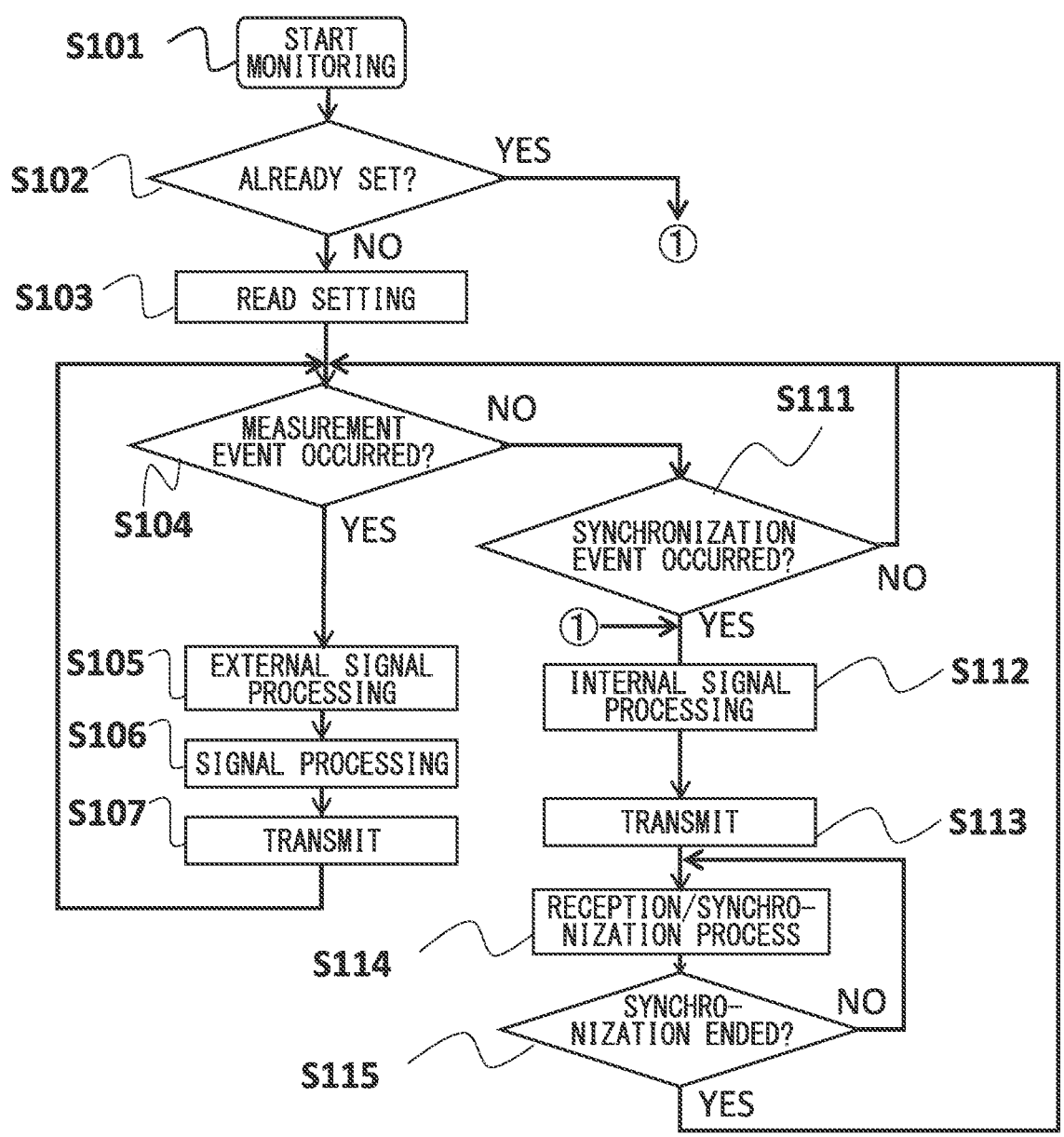
FIG. 11 is a flowchart illustrating a flow of processes performed by the node apparatus when the node apparatus monitors the state of the production facility.

FIG. 11 is a flowchart illustrating a flow of processes performed when the node apparatus 104 monitors the state of the production facility 101. Hereinafter, the description will be made for a case where the node apparatus 104 monitors the state of the production facility 101 by using the task table 601 illustrated in FIG. 6.

The node apparatus 104 starts to monitor the production facility 101 in Step S101. In Step S102, the node apparatus 104 determines whether a monitoring task of the node apparatus 104 has been set, that is, whether the CPU 212 can execute the monitoring task. If the node apparatus 104 determines in Step S102 that the monitoring task has not been set (S102: NO), then the node apparatus 104 proceeds to Step S103, and reads the setting of the monitoring task from the task table 601 of the storage portion 208, and thereby allows the CPU 212 to execute the monitoring task.

In Step S104, the node apparatus 104 checks whether a condition, such as a specified time, a specified time interval, or an external input, is satisfied, based on the event condition 604 of each task registered in the task table 601. That is, the node apparatus 104 checks whether a measurement event has occurred.

If a measurement event has occurred (S104: YES), then node apparatus 104 executes a corresponding task in accordance with the registrations of the task table 601. That is, in Step S105, the node apparatus 104 performs the setting of the signal input portion 204 by setting the signal input condition 605, including the registered input channel for physical quantity, the sampling frequency, the input range, the number of samples, and the amplification factor; and performs a signal input process, such as analog-digital conversion, based on the signal input condition 605 that has been set. In Step S106, the processing portion 205 performs, if necessary, a signal process (that is, signal processing performed on the digitized measurement data) in accordance with the signal processing condition 606.

In Step S107, the measurement data, on which the signal processing has been performed, is transmitted from the wireless-communication unit 207 of the input/output portion 206 in accordance with the output condition 607 registered in the task table 601. If another measurement event or a synchronization event has not occurred immediately after the measurement data is transmitted, the node apparatus 104 decreases the clock frequency or the power supply voltage of the signal input portion 204, the processing portion 205, and the wireless-communication unit 207; and enters a sleep state and remains in the sleep state until the next measurement event or a synchronization event occurs. In this manner, the node apparatus 104 reduces the consumption of the battery 210. Then the node apparatus 104 returns to Step S104 while the node apparatus 104 remains in the sleep state, and determines whether a measurement event has occurred.

If the measurement event has not occurred in Step S104 (S104: NO), then the node apparatus 104 proceeds to Step S111 and determines whether a synchronization event has occurred. If the synchronization event has not occurred (S111: NO), then the node apparatus 104 proceeds to Step S104 and determines again whether a measurement event has occurred.

If a synchronization event has occurred in Step S111 (S111: YES), or if the node apparatus 104 determines in Step S102 that the monitoring task of the node apparatus 104 has been set (registered) (S102: YES), then the node apparatus 104 proceeds to Step S112.

In Step S112, the node apparatus 104 performs the internal signal processing, and obtains the node information, such as the remaining battery level of the battery 210, the internal temperature measured by the temperature sensor 211, and the hash value of the setting information. In Step S113, the node apparatus 104 transmits the obtained node information to the gateway apparatus 105 by using the wireless-communication unit 207. After transmitting the node information in Step S113, the node apparatus 104, in Step S114, does not enter a sleep state and keeps a state where the node apparatus 104 can receive the synchronization information from the gateway apparatus 105 by using the wireless-communication unit 207.

In Step S115, the node apparatus 104 receives synchronization information, and determines by using the synchronization information whether the necessary synchronization process has been completed. If the synchronization process has not been completed (S115: NO), then the node apparatus 104 returns to Step S114. If the necessary synchronization process has been completed (S115: YES), then the node apparatus 104 decreases the clock or the power supply voltage of the signal input portion 204, the processing portion 205, and the wireless-communication unit 207; and enters a sleep state and remains in the sleep state until the next measurement event or synchronization event occurs. In this manner, the node apparatus 104 reduces the consumption of the battery 210. Then the node apparatus 104 returns to Step S104 while the node apparatus 104 remains in the sleep state, and determines whether a measurement event has occurred.

Flow of Operations of Gateway Apparatus

Figure 12:
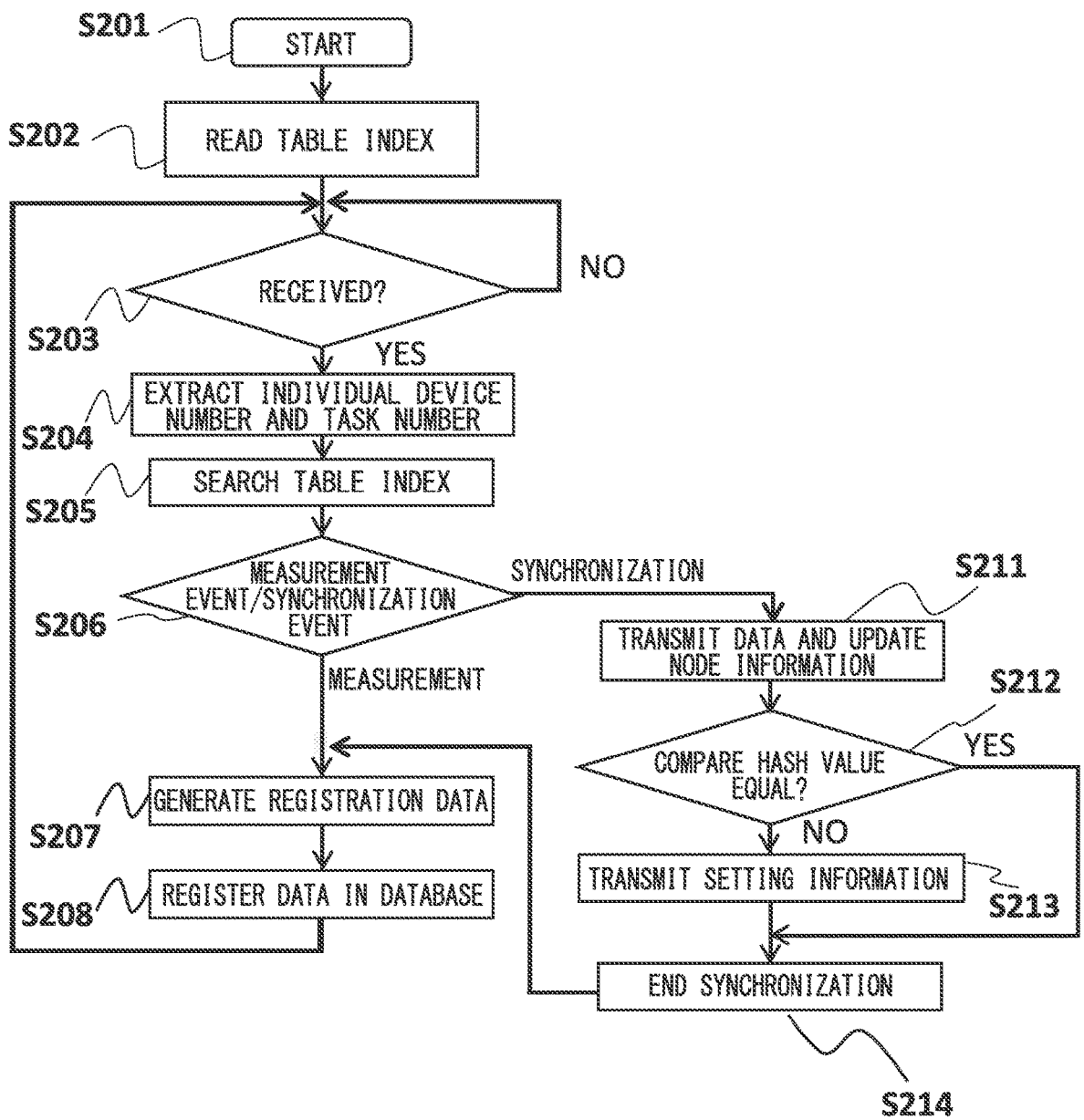
FIG. 12 is a flowchart illustrating a flow of processes performed by the gateway apparatus when the gateway apparatus collects and registers measurement data for monitoring the production facility.

FIG. 12 is a flowchart illustrating a flow of processes performed when the gateway apparatus 105 collects and registers the measurement data for monitoring the production facility 101. The following description will be made for a procedure in which the gateway apparatus 105 registers the measurement data sent from the node apparatus 104, in the database 107 for monitoring the production facility 101.

In Step S201, the gateway apparatus 105 starts to monitor the production facility 101. In Step S202, the gateway apparatus 105 reads the table index 701 that was stored in the storage device 303 in advance. In Step S203, the CPU 304 inquires of the wireless-communication unit 302 whether the wireless-communication unit 302 has received data wirelessly from the node apparatus 104.

Upon receiving the data from the node apparatus 104 (S203: YES), the gateway apparatus 105 extracts, in Step S204, a node number and a task number sent together with the measurement data. In Step S205, the CPU 304 compares the extracted node number and task number with the node number 702 and the task number 703 of the table index 701, for searching for the node number and the task number in the table index 701.

In Step S206, the CPU 304 determines which of the measurement event and the synchronization event the reception data is related to, and proceeds to Step S207 if the reception data is related to the measurement event. In Step S207, the CPU 304 determines a table 705 of the database 704 in which the measurement data is to be stored, by using a record of the table index 701 that has been found in the search performed in Step S205; and creates a query for registering the measurement data. In Step S208, the gateway apparatus 105 executes the query created in Step S207, and registers the measurement data in the table of the database.

On the other hand, if the gateway apparatus 105 determines in Step S206 that the reception data is related to the synchronization event, then the gateway apparatus 105 proceeds to Step S211 and transmits time information to the node apparatus 104. The time information transmitted from the gateway apparatus 105 may be obtained from the internal clock of the gateway apparatus 105, or from a device connected to the network via the wire-communication unit 305.

In Step S212, the gateway apparatus 105 compares the hash value 609 (contained in the reception data) of the task table 601 of the node apparatus 104, with the hash value 803 contained in the node hash-value table 801 stored in the monitoring gateway. If the hash values 609 and 803 are not equal to each other (S212: NO), then the gateway apparatus 105 proceeds to Step S213, and transmits a node task stored in the gateway apparatus, to the node apparatus 104. After the completion of the transmission, the gateway apparatus 105 notifies the node apparatus 104 of the end of the synchronization, in Step S214. Then the gateway apparatus 105 proceeds to Step S207, and creates a query for storing the node information. In Step S208, the gateway apparatus 105 executes the query, and registers the node information in a table of the database. Note that in a case where the hash values 609 and 803 are equal to each other in Step S212 (S212: YES), since the task table of the node apparatus 104 is unchanged, the gateway apparatus 105 proceeds to Step S214 without transmitting the task table, and notifies the node apparatus 104 of the end of the synchronization.

In the present embodiment, even in a case where the synchronization event is set separately from the measurement event in an autonomous sensor system, the node apparatus can autonomously execute the synchronization event at a necessary timing. As a result, the present embodiment can provide a method that synchronizes the node apparatus, which has a limitation on communication timing, with the higher-level system while reducing the power consumption.

Second Embodiment

Next, a second embodiment of the present invention will be described with reference to the accompanying drawings. The description for features identical to those of the first embodiment will be simplified or omitted. In the second embodiment, the description will be made for a procedure for determining the event condition of synchronization based on the radio field intensity in which the gateway apparatus 105 and the node apparatus 104 communicate wirelessly with each other. The wireless-communication unit 302 of the gateway apparatus 105 of the present embodiment not only transmits/receives data to/from the node apparatus 104, but also obtains the radio field intensity in which the node apparatus 104 transmits data to the gateway apparatus 105.

Figure 13:
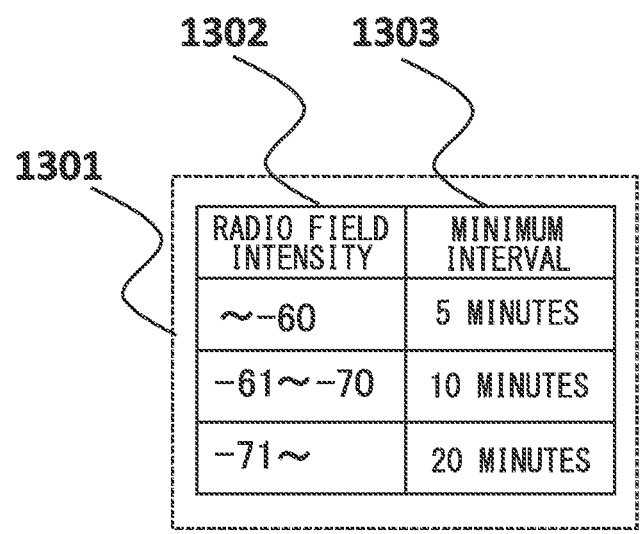
FIG. 13 is a diagram illustrating a radio-field-intensity threshold table stored in a gateway apparatus of a second embodiment.

FIG. 13 illustrates an example of a radio-field-intensity threshold table 1301 stored in the storage device 303 of the gateway apparatus 105. In a column of a radio field intensity 1302 contained in the radio-field-intensity threshold table 1301, the level of the radio field intensity is defined. In addition, in a column of a minimum interval 1303, a time interval at which the synchronization task is performed is set. Note that FIG. 13 illustrates not only the contents of the radio-field-intensity threshold table 1301 stored in the storage device 303, but also a configuration of a displayed image created when the radio-field-intensity threshold table 1301 is displayed on the screen of a display device.

FIG. 14 illustrates a synchronization-time table 1401 stored in the storage device 303 of the gateway apparatus 105. The synchronization-time table 1401 includes a column of a node number 1402, a column of a synchronization time 1403, and a column of a radio field intensity 1404. The column of the node number 1402 is used for identifying a node apparatus that the gateway apparatus 105 communicates with. The column of the synchronization time 1403 is related to a timing at which the gateway apparatus 105, together with each node apparatus, performs a synchronization task. The column of the radio field intensity 1404 is related to the intensity of a radio wave sent from each node apparatus. The gateway apparatus 105 controls a timing, based on the synchronization-time table 1401, at which the gateway apparatus 105 performs a synchronization task for a corresponding node apparatus. Note that FIG. 14 illustrates not only the contents of the synchronization-time table 1401 stored in the storage device 303, but also a configuration of a displayed image created when the synchronization-time table 1401 is displayed on the screen of a display device. The gateway apparatus 105 determines a synchronization time 1403, depending on the radio-field-intensity threshold table 1301 and a measured radio-field-intensity value of a radio wave sent from each node apparatus.

If the gateway apparatus 105 determines in Step S206 of the flowchart illustrated in FIG. 12 that the reception data is related to a synchronization event, then the gateway apparatus 105 proceeds to Step S211, puts a measured radio-field-intensity value of a radio wave sent from the node apparatus, in the synchronization-time table 1401; and determines the synchronization time 1403, depending on the radio-field-intensity threshold table 1301. For example, in a case where a radio wave sent from one node apparatus (i.e., a first node apparatus) has high intensity, the failure of communication, related to a synchronization event, between the one node apparatus and the gateway apparatus hardly occurs even if the gateway apparatus communicates with another node apparatus (i.e., a second node apparatus) at a timing closer to the timing at which the gateway apparatus communicates with the one node apparatus. Thus, the minimum interval between the communication for the first node apparatus and the communication for the second node apparatus can be set smaller. In this manner, the gateway apparatus can adjust the interval between a timing at which the first node apparatus executes a synchronization task and a timing at which the second node apparatus executes a synchronization task.

In this example, the radio field intensity of a node apparatus whose node number 1402 is 101 is equal to or larger than −60, and the radio field intensity of a node apparatus whose node number 1402 is 102 is also equal to or larger than −60. Thus, the interval between a timing at which the node apparatus whose node number 1402 is 101 or 102 executes a synchronization task and a timing at which another node apparatus executes a synchronization task is set at 5 minutes in accordance with the radio-field-intensity threshold table 1301. The radio field intensity of a node apparatus whose node number 1402 is 103 is in a range from −70 to −61. Thus, the interval between a timing at which the node apparatus whose node number 1402 is 103 executes a synchronization task and a timing at which another node apparatus executes a synchronization task is set at 10 minutes. The radio field intensity of a node apparatus whose node number 1402 is 104 is equal to or smaller than −71, and the radio field intensity of a node apparatus whose node number 1402 is 105 is also equal to or smaller than −71. Thus, the interval between a timing at which the node apparatus whose node number 1402 is 104 or 105 executes a synchronization task and a timing at which another node apparatus executes a synchronization task is set at 20 minutes. In this manner, a timing at which one node apparatus executes a synchronization task does not overlap with a timing at which another node apparatus executes a synchronization task, and an interval between a timing at which one node apparatus executes a synchronization task and a timing at which another node apparatus executes a synchronization task is varied in accordance with a measured radio field intensity. As a result, problems of the wireless-communication unit 302, such as radio-wave interference and congestion, can be reduced, so that the unnecessary power consumption can be reduced.

FIG. 15 is a diagram illustrating a synchronization setting screen 1501 displayed on a display screen when the management apparatus 108 executes an application for setting operations of the gateway apparatus 105 and the node apparatus 104.

For setting the radio-field-intensity threshold table 1301 in the gateway apparatus, an operator may create the radio-field-intensity threshold table 1301 by executing an application of the management apparatus 108 in advance, and load the radio-field-intensity threshold table 1301 into the storage device 303 of the gateway apparatus, via a computer-readable recording medium or a network. In another case, an operator may communicatively connect the management apparatus 108 and the gateway apparatus by using the wire-communication unit 305, and may create or edit the radio-field-intensity threshold table 1301 in the gateway apparatus, by using an application of the management apparatus 108.

If the synchronization-time table 1401 is updated, the gateway apparatus 105 updates the event condition 604 of a synchronization event (that is, in this example, an event whose task number 602 is 0) of the task table 601 of the node apparatus 104. If the task table 601 is updated, the hash values 609 and 803 are updated. In this example, the gateway apparatus 105 determines in Step S212 of the flowchart illustrated in FIG. 12 that the hash value contained in the node information sent from the node apparatus 104 is different from the hash value of the task table 601 of the node apparatus 104, stored in the gateway apparatus. Thus, the gateway apparatus 105 transmits the task table 601 in Step S213, and thereby updates the synchronization time used after that, by updating the task table of the node apparatus 104. The update of the minimum interval based on the radio field intensity and the update of the task table may be performed every time the synchronization is performed, or may be performed collectively at a different timing.

In the present embodiment, the event condition of a synchronization task of the node apparatus is determined in accordance with the radio field intensity of a radio communication sent from the node apparatus to the gateway apparatus. Thus, even when the gateway apparatus is synchronized with a node apparatus having low radio-field intensity, and a resending process or an error handling process is performed, the gateway apparatus can execute the process without causing the process to overlap with a synchronization event of another node apparatus. Thus, the present embodiment can provide a method that synchronizes the gateway apparatus and the node apparatus while reducing the unnecessary power consumption.

Third Embodiment

Next, a third embodiment of the present invention will be described with reference to the accompanying drawings. The description for features identical to those of the above-described embodiments will be simplified or omitted. In the third embodiment, the description will be made for a procedure in which if the data on a synchronization event from the node apparatus is not received by the gateway apparatus at a specified date and time that is the event condition of a corresponding synchronization task, the gateway apparatus notifies the management apparatus of the error as an error of the node apparatus.

Figure 16:
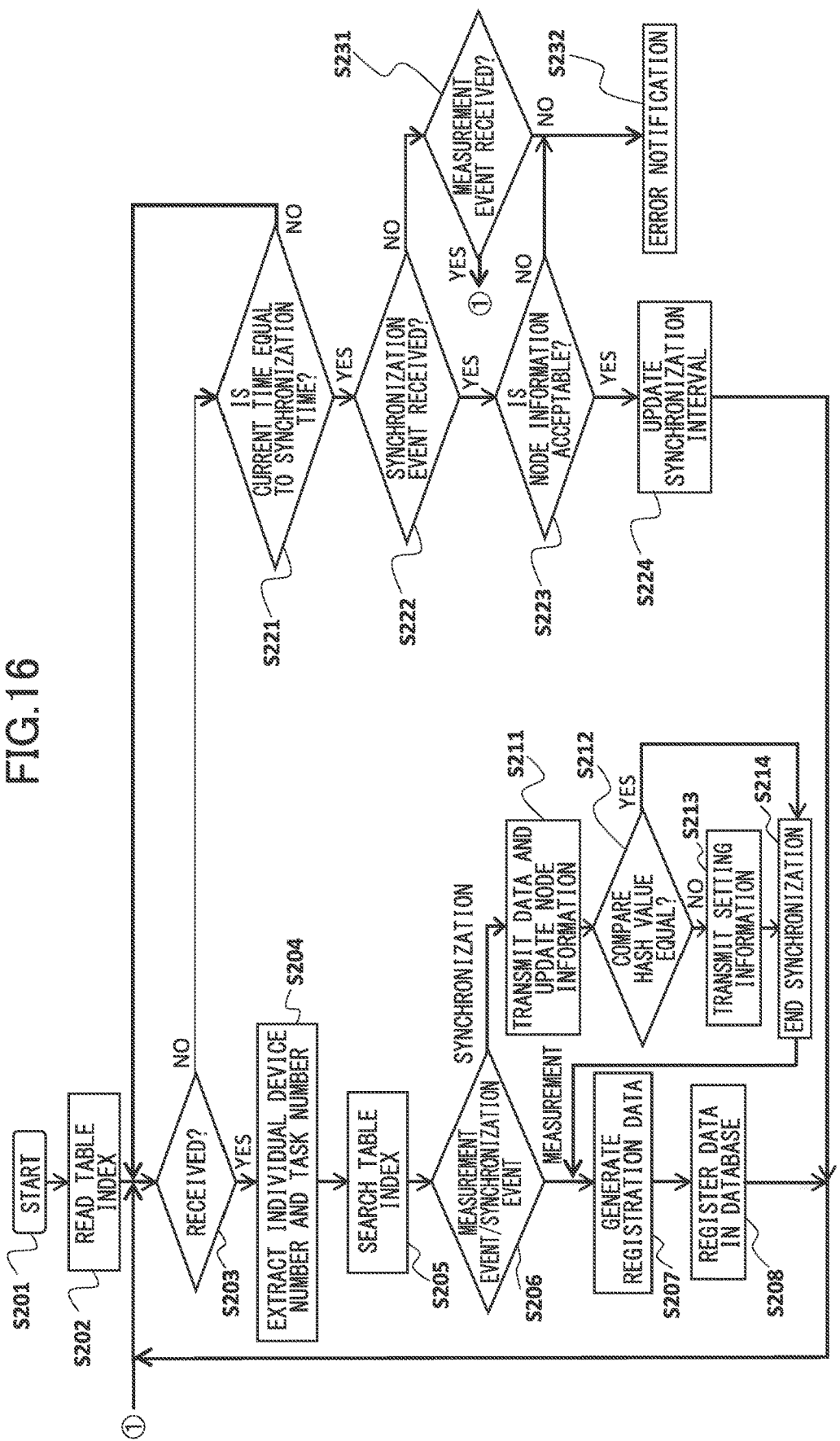
FIG. 16 is a flowchart illustrating a procedure of processes performed by a gateway apparatus of a third embodiment.

FIG. 16 is a flowchart illustrating a procedure of processes performed by the gateway apparatus 105. In Step S203, the gateway apparatus inquires of the wireless-communication unit 302 whether the wireless-communication unit 302 has received data wirelessly from the node apparatus 104. If the wireless-communication unit 302 has not received any data (Step S203: NO), then the gateway apparatus 105 proceeds to Step S221, and checks whether the synchronization time 1403 of the synchronization-time table 1401 is equal to a current time. If the synchronization time 1104 is equal to the current time (Step S221: YES), then the gateway apparatus 105 proceeds to Step S222, and checks whether the gateway apparatus 105 has already received a synchronization event.

If the gateway apparatus 105 has received the synchronization event (Step S222: YES), then the gateway apparatus 105 proceeds to Step S223, and checks the node information, such as the remaining battery level and the radio field intensity. If the gateway apparatus 105 determines that the node information is acceptable (Step S223: YES), then the gateway apparatus 105 updates the synchronization-time table 1101 in Step S224. If the gateway apparatus 105 has not received a synchronization event although the synchronization time 1104 is equal to the current time (Step S222: NO), then the gateway apparatus 105 checks in Step S231 whether the gateway apparatus 105 has received a measurement event. If the gateway apparatus 105 has received the measurement event (Step S231: YES), then the gateway apparatus 105 proceeds to Step S203, and performs a receiving process.

Figure 17:
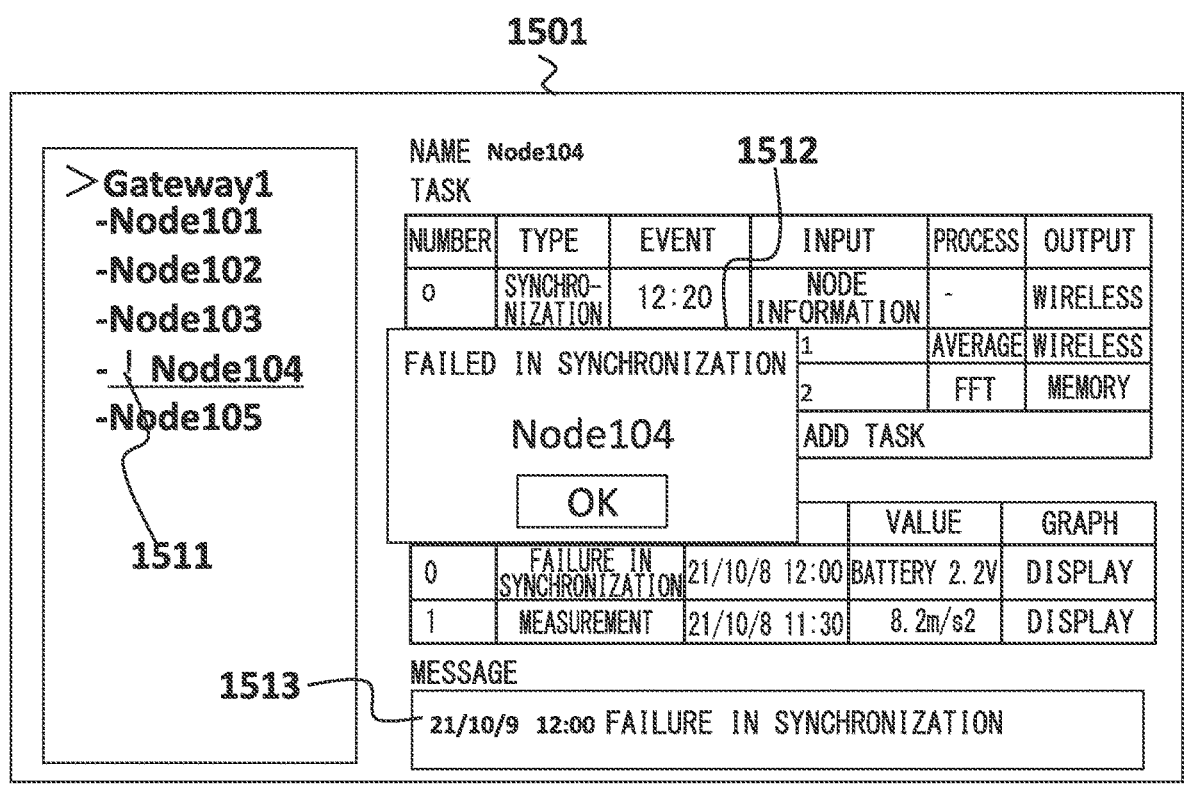
FIG. 17 is a diagram illustrating a synchronization setting screen displayed on a display screen when a management apparatus of the third embodiment executes an application.

FIG. 17 is a diagram illustrating a synchronization setting screen 1501 displayed on a display screen when the management apparatus 108 executes an application for setting operations of the gateway apparatus 105 and the node apparatus 104. If none of a synchronization event and a measurement event is received when the synchronization time 1104 is equal to a current time, the node apparatus 104 may have a failure, and may be unable to transmit any data to the gateway apparatus 105. In this case, in Step S232, the gateway apparatus 105 notifies the management apparatus 108 of the error of the node apparatus 104. For example, the gateway apparatus 105 causes a synchronization setting screen 1501 of an application of the management apparatus 108 to display a symbol 1511, a notification 1512, and a message 1513. Note that the gateway apparatus 105 may determine in Step S221 that the synchronization time 1104 is equal to a current time, if the difference between the synchronization time 1104 and the current time is in a predetermined range. In this case, the range is determined in consideration of an error of time, such as the time lag between the clock of the node apparatus 104 and the clock of the gateway apparatus 105 and a communication delay.

The node apparatus 104 is controlled so as to execute the measurement event, performed in Step S104, with higher priority than that of the synchronization event performed in Step S111. Thus, if the timing of a measurement task overlaps with the timing of a synchronization task, the node apparatus 104 executes the measurement task first, and then executes the synchronization task. In this case, since the gateway apparatus 105 receives, in Step S231, the synchronization task after receiving the measurement event, the gateway apparatus 105 does not perform the error notification in Step S232.

The present embodiment can provide a method in which if the gateway apparatus does not receive the data on a synchronization event, from the node apparatus at a predetermined time, the gateway apparatus detects that the node apparatus has an error, and notifies the management apparatus of the error of the node apparatus.

Fourth Embodiment

Next, a fourth embodiment of the present invention will be described with reference to the accompanying drawings. The description for features identical to those of the above-described embodiments will be simplified or omitted. In the fourth embodiment, the description will be made for a procedure in which when a node apparatus is introduced, the node apparatus obtains the synchronization timing and the task table from the gateway apparatus.

Figure 18:
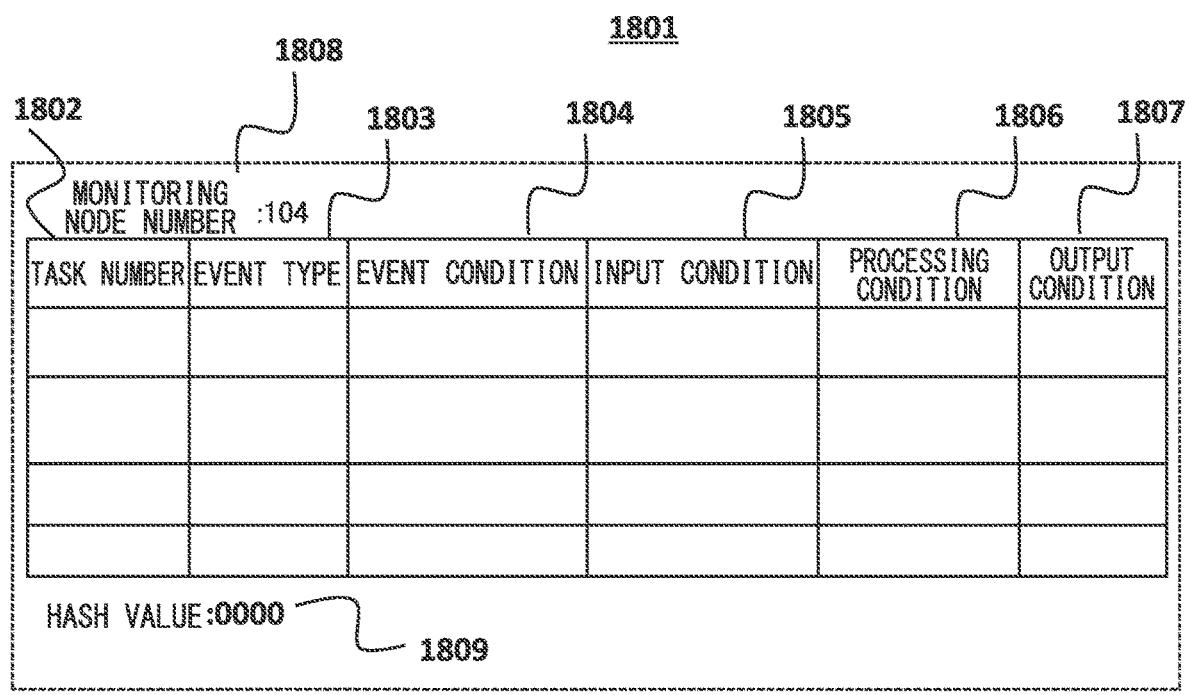
FIG. 18 is a diagram illustrating a task table of a node apparatus, obtained before the synchronization with a gateway apparatus is performed in a fourth embodiment.

FIG. 18 is a diagram illustrating a task table 1801 of the node apparatus 104, obtained before the synchronization with the gateway apparatus 105 is performed. Since the node apparatus 104 has still not been synchronized with the gateway apparatus 105, no measurement task is registered in the task table 1801. When the node apparatus 104 is activated in Step S101 of the flowchart of FIG. 11, the node apparatus 104 determines in Step S102 that no measurement task is set, because no measurement task is registered in the task table 1801. If the node apparatus 104 determines in Step S111 that a synchronization event has occurred, the node apparatus 104 obtains, in Step S112, the node information, such as the battery voltage and internal temperature of the node apparatus 104 and the hash value of the setting information, and causes the input/output portion 206 to transmit the node information via the wireless-communication unit 207, in Step S113.

The gateway apparatus 105 transmits the time to the node apparatus 104 in Step S211 of the flowchart of FIG. 12, and after that, compares a hash value contained in the node hash-value table 801 of the gateway apparatus 105, with the hash value contained in the node information, in Step S212. In this case, since no measurement task is registered in the node apparatus 104, the hash value contained in the node hash-value table 801 is not equal to the hash value contained in the node information. Thus, the gateway apparatus 105 proceeds to Step S213, and transmits the task table 601 to the node apparatus 104.

Then, the node apparatus 104 receives the task table 601 in Step S114 of the flowchart of FIG. 11, and performs the synchronization process for updating the setting. The gateway apparatus 105 notifies the node apparatus 104 of the end of the synchronization in Step S214; and the node apparatus 104 receives the notification, and determines the end of the synchronization in Step S115. If a measurement event and a synchronization event do not occur after the synchronization, the node apparatus 104 decreases the clock of the signal input portion 204 and the processing portion 205 of the node apparatus 104, and enters a sleep state and remains in the sleep state until the next measurement event or synchronization event occurs.

In the present embodiment, when a node apparatus is introduced, the node apparatus can perform the synchronization of setting by obtaining the synchronization timing and the task table from the gateway apparatus.

Fifth Embodiment

Next, a fifth embodiment of the present invention will be described with reference to the accompanying drawings. The description for features identical to those of the above-described embodiments will be simplified or omitted. In the fifth embodiment, the description will be made for a procedure in which when the battery voltage of the node apparatus has decreased, the battery life is increased by changing the interval of synchronization timing.

Figure 19:
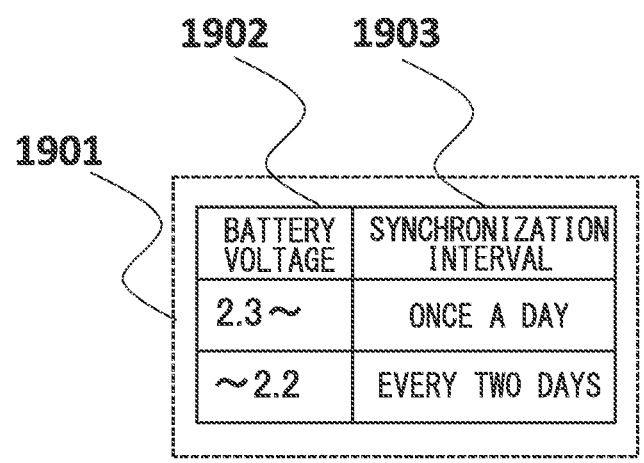
FIG. 19 is a diagram illustrating a battery-voltage threshold table stored in a gateway apparatus of a fifth embodiment.

FIG. 19 illustrates an example of a battery-voltage threshold table 1901 stored in the storage device 303 of the gateway apparatus 105. The battery-voltage threshold table 1901 contains a column of a battery voltage 1902, and a column of a synchronization interval 1903 that is set corresponding to the battery voltage 1902. For setting the battery-voltage threshold table 1901 in the gateway apparatus, an operator may create the battery-voltage threshold table 1901 by executing an application of the management apparatus 108 in advance, and load the battery-voltage threshold table 1901 into the storage device 303 of the gateway apparatus, via a computer-readable recording medium or a network. In another case, an operator may communicatively connect the management apparatus 108 and the gateway apparatus by using the wire-communication unit 305, and may create or edit the battery-voltage threshold table 1901 in the gateway apparatus, by using an application of the management apparatus 108.

Figure 20:
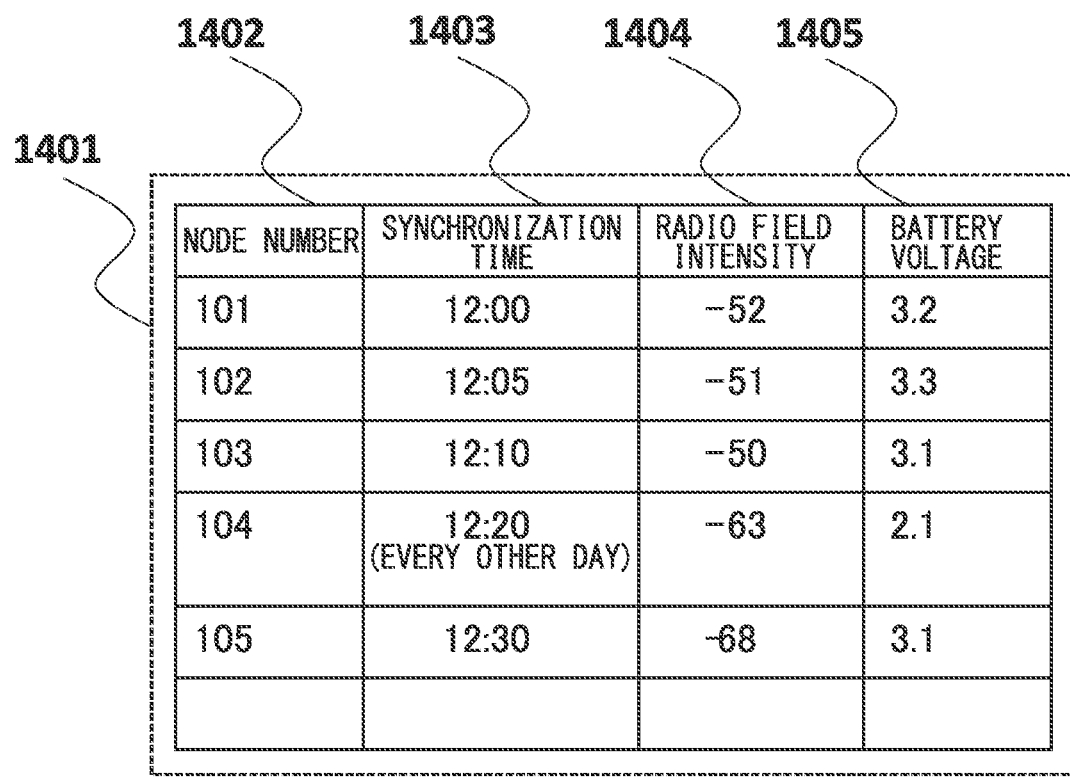
FIG. 20 is a diagram illustrating a synchronization-time table stored in the gateway apparatus of the fifth embodiment.

FIG. 20 illustrates an example of a synchronization-time table 1401 stored in the storage device 303 of the gateway apparatus 105. If a synchronization event occurs, the node apparatus 104 obtains a voltage value of the battery 210 by performing the internal signal processing in Step S112 of the flowchart of FIG. 11, and transmits the voltage value to the gateway apparatus 105, as the node information, in Step S113.

The gateway apparatus 105 transmits the time to the node apparatus 104, and updates the information of the synchronization-time table 1401 in Step S211 of the flowchart of FIG. 12. For example, if the battery voltage of a node apparatus whose node number is 104 is lower than 2.2 V, the gateway apparatus 105 changes the event condition 604 of the synchronization task of the task table 601 of the node apparatus whose node number is 104, from "every day" to "every other day", based on the battery-voltage threshold table 1901. Since the synchronization interval is set longer, the battery consumption can be reduced, and thereby the battery life of the node apparatus 104 can be increased.

After the task table 601 is updated, the gateway apparatus 105 determines in Step S212 that the hash value of the updated task table 601 is not equal to the hash value of the task table 601 sent from the node apparatus 104. Thus, the gateway apparatus 105 proceeds to Step S213, and transmits the task table 601 to the node apparatus 104. Then, the node apparatus 104 receives the task table 601 in Step S114, and performs the synchronization process for updating the setting. The gateway apparatus 105 notifies the node apparatus 104 of the end of the synchronization in Step S214, and ends the synchronization. The node apparatus ends the synchronization in Step S115. If a measurement event and a synchronization event do not occur after the synchronization, the node apparatus 104 decreases the clock of the signal input portion 204 and the processing portion 205, and enters a sleep state and remains in the sleep state until the next measurement event or synchronization event occurs.

In the present embodiment, when the battery voltage of the node apparatus has decreased, the interval of the synchronization timing is set longer. Thus, the battery consumption can be reduced, and thereby the battery life can be increased.

Sixth Embodiment

Next, a sixth embodiment of the present invention will be described with reference to the accompanying drawings. The description for features identical to those of the above-described embodiments will be simplified or omitted. In the sixth embodiment, the description will be made for a procedure in which the gateway apparatus synchronizes with the node apparatus while changing the synchronization timing in accordance with the operation state of the node apparatus. Thus, the present embodiment can reduce the power consumption while increasing the usability. For example, the gateway apparatus obtains the information on which of an operation state and an adjustment state the node apparatus is in. If the node apparatus is in the adjustment state, the gateway apparatus sets the interval between the current synchronization task and the next synchronization task shorter than that of the node apparatus that is in the operation state.

Figure 21:
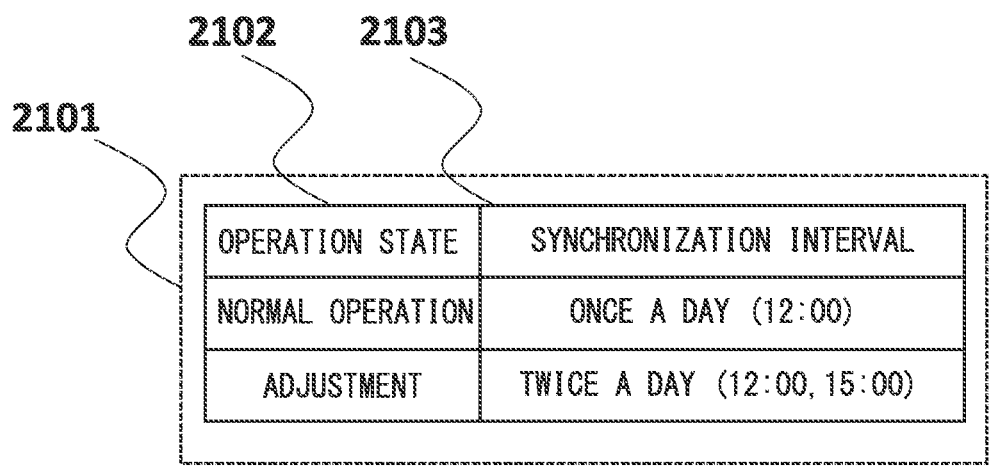
FIG. 21 is a diagram illustrating an operation-state table stored in a gateway apparatus of a sixth embodiment.

FIG. 21 illustrates an example of an operation-state table 2101 stored in the storage device 303 of the gateway apparatus 105. The operation-state table 2101 contains a column of an operation state 2102, and a column of a synchronization interval 2103 that is set corresponding to the operation state 2102. For example, if parameters for a node apparatus are frequently adjusted immediately after the node apparatus is introduced, a user sets the synchronization interval in advance in accordance with the operation state 2102. For setting the operation-state table 2101, an operator may create the operation-state table 2101 by executing an application of the management apparatus 108 in advance, and load the operation-state table 2101 into the storage device 303 of the gateway apparatus, via a computer-readable recording medium or a network. In another case, an operator may communicatively connect the management apparatus 108 and the gateway apparatus by using the wire-communication unit 305, and may create or edit the operation-state table 2101 in the gateway apparatus, by using an application of the management apparatus 108. In the example of FIG. 21, in a case where the operation state 2102 is "adjustment", the synchronization is performed twice a day. In this case, however, the synchronization may be performed twice or more a day.

FIG. 22 illustrates a synchronization-time table 1401 stored in the storage device 303 of the gateway apparatus 105. A user changes the operation state 1406 in accordance with the operation state of the node apparatus 104. The following description will be made for a case where a node apparatus 104 whose node number 1402 is 101 is operated in an adjustment state. If the gateway apparatus 105 receives the node information from the node apparatus 104 when a synchronization event occurs, the gateway apparatus 105 transmits the time to the node apparatus 104, and updates the information of the synchronization-time table 1401 in Step S211 of the flowchart of FIG. 12. The gateway apparatus 105 determines, based on the operation-state table 2101, that the node apparatus whose node number 1402 is 101 is operated in an adjustment state. Thus, the gateway apparatus 105 updates the task table 601 of the node apparatus 104 whose node number is 101, such that the event condition 604 of the synchronization task is set so that the synchronization will be performed at 12:00 and 15:00. After the updating, since the hash value of the task table 601 sent from the node apparatus 104 is not equal to the hash value of the task table 601 stored in the gateway apparatus 105 in Step S212, the gateway apparatus 105 transmits the task table 601 to the node apparatus 104 in Step S213. Then, the node apparatus 104 receives the task table 601 in Step S114, and performs the synchronization process for updating the setting. The gateway apparatus 105 notifies the node apparatus 104 of the end of the synchronization in Step S214, and the node apparatus 104 ends the synchronization in Step S115. If a measurement event and a synchronization event do not occur after the end of the synchronization, the node apparatus 104 decreases the clock of the signal input portion 204 and the processing portion 205 of the node apparatus 104, and enters a sleep state and remains in the sleep state until the next measurement event or synchronization event occurs. After the task table 601 is updated, the synchronization event will occur twice a day: 12:00 and 15:00.

In the present embodiment, the gateway apparatus can synchronize with the node apparatus while selecting an operation state of the node apparatus and changing the interval of the synchronization task in accordance with the operation state of the node apparatus. Thus, the present embodiment can reduce the power consumption while increasing the usability.

Seventh Embodiment

Next, a seventh embodiment of the present invention will be described with reference to the accompanying drawings. The description for features identical to those of the above-described embodiments will be simplified or omitted. In the seventh embodiment, the description will be made for a procedure in which if the communication time becomes insufficient, due to a resending process in wireless communication, while the node apparatus and the gateway apparatus are in synchronization with each other, the gateway apparatus sets another synchronization time for the node apparatus.

Figure 23:
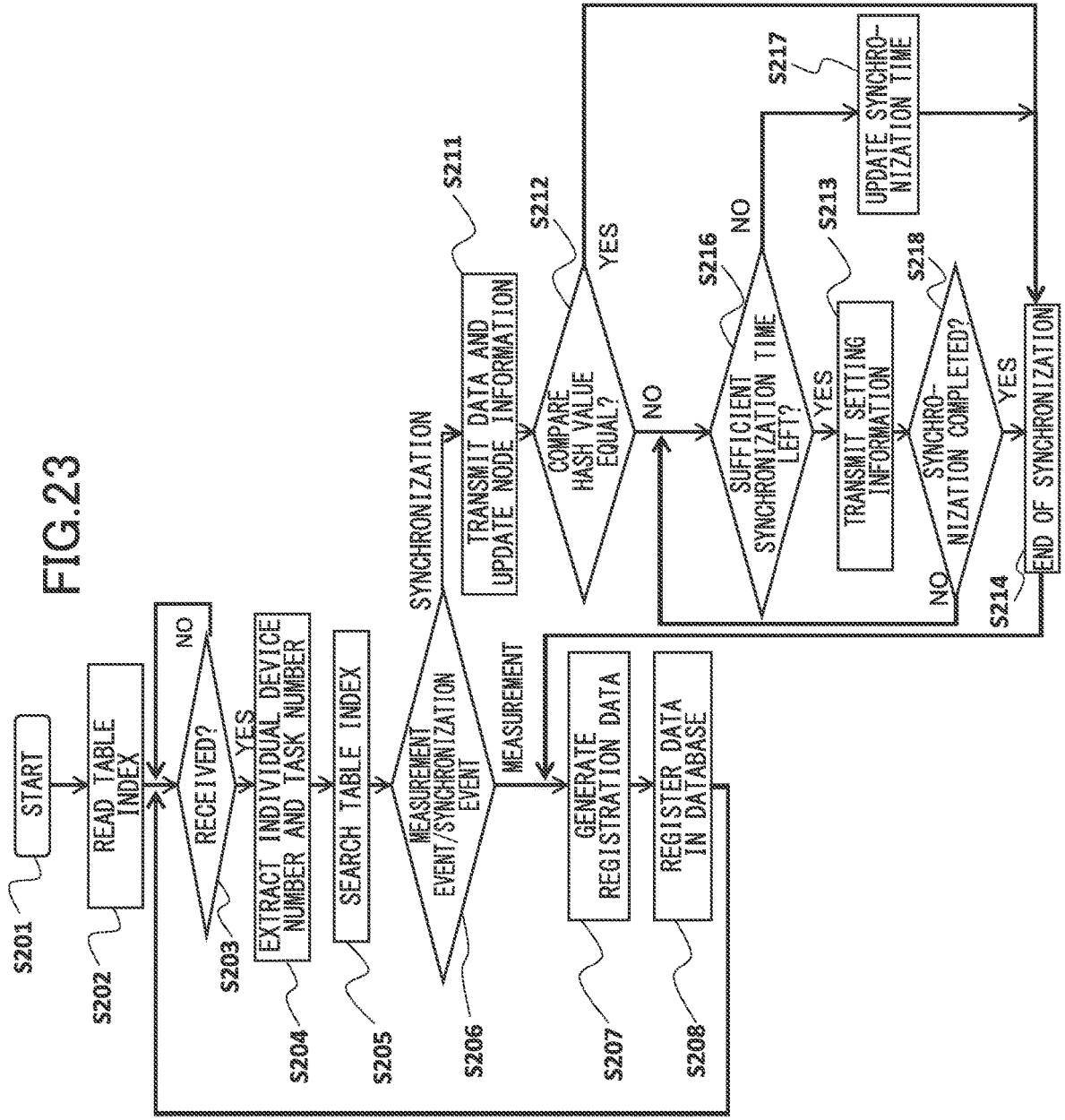
FIG. 23 is a flowchart illustrating a procedure of processes performed by a gateway apparatus of a seventh embodiment.

FIG. 23 is a flowchart illustrating a flow of processes performed by the gateway apparatus 105. The gateway apparatus 105 transmits the time to the node apparatus 104 in Step S211, and after that, compares a hash value contained in the node hash-value table 801 of the gateway apparatus 105, with a hash value contained in the node information, in Step S212. If the hash value contained in the node hash-value table 801 is not equal to the hash value contained in the node information, the gateway apparatus 105 checks in Step S216 whether the remaining synchronization time is sufficient for the amount of data to be transmitted from the gateway apparatus 105 to the node apparatus 104. Note that the remaining synchronization time is the interval between a synchronization time assigned to one node apparatus in the synchronization-time table 1401 and a synchronization time assigned to another node apparatus. If one synchronization process for one node apparatus overlaps with another synchronization process for another node apparatus performed at another synchronization time, the synchronization process may be delayed or the radio-wave interference may occur. For this reason, it is preferable that one synchronization process do not overlap with another synchronization process. In the present embodiment, the gateway apparatus 105 checks, in Step S216, the remaining synchronization time, based on a current time and the next synchronization time. If the remaining synchronization time is sufficient, then the gateway apparatus 105 transmits the setting information to the node apparatus 104 in Step S213. On the other hand, if the gateway apparatus 105 determines in Step S216 that the remaining synchronization time is insufficient, the gateway apparatus 105 sets another synchronization time. The gateway apparatus 105 transmits the synchronization time updated in Step S217, and notifies the node apparatus 104 of the end of the synchronization, in Step S214. At the synchronization time updated in Step S217, the node apparatus 104 will generate a synchronization event again, and synchronize with the gateway apparatus 105.

In the present embodiment, if the time interval between a current time and the synchronization time of another node apparatus becomes insufficient while the gateway apparatus is in synchronization with a node apparatus, the gateway apparatus sets another synchronization time. As a result, the gateway apparatus can synchronize with the node apparatus while reducing the influence caused by the delay of the synchronization process and the radio-wave interference.

Modifications

The present invention is not limited to the above-described embodiments and examples, and can be variously modified within the technical concept of the present invention. For example, the above-described different embodiments may be embodied, combined with each other.

The information processing method and the information processing device of the present invention can be used for managing not only the production facility but also various machines and facilities, such as an industrial robot, a service robot, and a processing machine that is numerically controlled by a computer. For example, the present disclosure can be applied to mechanical equipment and a facility. The mechanical equipment can automatically perform expansion and contraction, bending and stretching, up-and-down movement, right-and-left movement, pivot, or combined movement thereof, in accordance with information stored in the storage device of the control device.

In addition, a method of manufacturing products by using a node apparatus to which the present invention has been embodied, a gateway apparatus that can communicate with the node apparatus, a management apparatus, and a manufacturing apparatus can be included in the embodiments of the present invention. When products are manufactured, an input portion of the node apparatus is connected with a sensor that obtains information on the state of the manufacturing apparatus, and the data obtained from the sensor in a measurement task is transmitted by using a communication portion, from the node apparatus to the gateway apparatus. The battery of the node apparatus is not excessively exhausted, so that products can be manufactured for a long time while the state of the manufacturing apparatus is monitored. A method that manufactures products by using the production facility while causing the information processing system of the present invention to obtain the state of the production facility is also included in the embodiments of the present invention.

A control program that can execute the above-described information processing method or control method, and a computer-readable recording medium that stores the control program are also included in the embodiments of the present invention.

The present invention may be embodied by supplying a program that achieves one or more functions of the above-described embodiments, to a system or a device via a network or a storage medium, and by causing one or more processors of the system or the device to read and execute the program. In addition, the present disclosure may also be embodied by using a circuit (e.g., an ASIC) that achieves one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-21819, filed Feb. 16, 2022, which is hereby incorporated by reference herein in its entirety.

What is claimed is:

1. A node apparatus configured to be connected with a sensor comprising:
   a communication portion configured to communicate with a gateway apparatus; and
   a control portion,
   wherein the control portion is configured to execute
      a first task in which the control portion transmits data obtained from the sensor, to the gateway apparatus by using the communication portion, and
      a second task in which the control portion transmits information on synchronization with the gateway apparatus, to the gateway apparatus by using the communication portion at a timing different from a timing at which the control portion executes the first task.

2. The node apparatus according to claim 1, wherein the control portion is configured to suspend the communication portion after executing the first task and execute the second task after suspending the communication portion.

3. The node apparatus according to claim 1, wherein after the control portion transmits the information in the second task, the control portion controls the communication portion for causing the communication portion to be in a state where the communication portion is able to receive a signal from the gateway apparatus.

4. The node apparatus according to claim 1, wherein after the control portion transmits the information in the second task, the control portion obtains one or more of
   information on a timing at which the control portion executes the second task,
   time information, and a signal that notifies the node apparatus of an end of the second task from the gateway apparatus, via the communication portion.

5. The node apparatus according to claim 1, wherein after the control portion transmits the information in the second task, the control portion ends the second task after a predetermined time has elapsed or after the node apparatus receives a signal that notifies the node apparatus of an end of the second task.

6. The node apparatus according to claim 1, wherein the control portion is configured to suspend the communication portion after the control portion ends the second task.

7. The node apparatus according to claim 1, wherein the information that the control portion transmits in the second task includes one or more of
a flag that represents the second task,
identification information of the node apparatus,
information on a remaining battery level of the node apparatus,
information on an internal temperature of the node apparatus, and
a hash value of the information.

8. The node apparatus according to claim 1, wherein the control portion is configured to execute the first task or the second task, depending on an event condition contained in a task table stored in a storage portion of the node apparatus.

9. The node apparatus according to claim 8, wherein if the event condition on the first task or the second task is not set in the task table, the control portion requests the gateway apparatus that the gateway apparatus transmit the event condition, by using the communication portion.

10. A system comprising:
the node apparatus according to claim 1;
a gateway apparatus configured to communicate with the node apparatus; and
a management apparatus.

11. The system according to claim 10, wherein if the gateway apparatus has not received the data at a timing at which the first task is executed, or has not received the information on synchronization at a timing at which the second task is executed, the gateway apparatus notifies the management apparatus that the gateway apparatus has not received the data or the information.

12. The system according to claim 10, wherein the information transmitted by the node apparatus in the second task includes a hash value of the information,
wherein the gateway apparatus is configured to compare the hash value of the information sent from the node apparatus, with a hash value stored in a storage portion of the gateway apparatus,
wherein if the hash value of the information sent from the node apparatus is not equal to the hash value stored in the storage portion of the gateway apparatus, the gateway apparatus transmits setting information stored in the storage portion of the gateway apparatus, and causes the node apparatus to update setting information stored in the node apparatus, and
wherein if the hash value of the information sent from the node apparatus is equal to the hash value stored in the storage portion of the gateway apparatus, the gateway apparatus transmits a signal that notifies the node apparatus of an end of the second task.

13. The system according to claim 10, wherein the gateway apparatus is configured to set a timing at which the second task is executed next by the node apparatus, in accordance with radio field intensity obtained when the gateway apparatus receives information on synchronization from the node apparatus.

14. The system according to claim 10, wherein if the gateway apparatus receives information on a remaining battery level of the node apparatus, as information on synchronization, from the node apparatus, the gateway apparatus sets a timing at which the second task is executed next by the node apparatus, in accordance with the remaining battery level.

15. The system according to claim 10, wherein the gateway apparatus is configured to obtain information on which of an operation state and an adjustment state the node apparatus is in, and if the node apparatus is in the adjustment state, the gateway apparatus sets an interval between the second task and the second task executed next, shorter than that of the node apparatus that is in the operation state.

16. The system according to claim 10, wherein the node apparatus includes a first node apparatus and a second node apparatus, and
wherein the gateway apparatus is configured to adjust an interval between a timing at which the first node apparatus executes the second task and a timing at which the second node apparatus executes the second task.

17. A method of controlling a node apparatus configured to be connected with a sensor and including
a communication portion configured to communicate with a gateway apparatus, and
a control portion,
the method comprising:
executing, by the control portion, a first task in which the control portion transmits data obtained from the sensor, to the gateway apparatus by using the communication portion; and
executing, by the control portion, a second task in which the control portion transmits information on synchronization with the gateway apparatus, to the gateway apparatus by using the communication portion at a timing different from a timing at which the control portion executes the first task.

18. A method of controlling a system, the system including
the node apparatus according to claim 1,
the gateway apparatus configured to communicate with the node apparatus, and
a management apparatus,
the method comprising:
notifying, by the gateway apparatus, the management apparatus that the gateway apparatus has not received data or information on synchronization if the gateway apparatus has not received the data at a timing at which the first task is executed, or has not receive the information at a timing at which the second task is executed.

19. A method of manufacturing products by using
the node apparatus according to claim 1,
the gateway apparatus configured to communicate with the node apparatus,
a management apparatus, and
a manufacturing apparatus,
the node apparatus being connected with a sensor that obtains information on state of the manufacturing apparatus,
the method comprising:
transmitting data obtained from the sensor in the first task, to the gateway apparatus by using the communication portion.

20. A computer-readable non-transitory recording medium storing a control program that causes the control portion to execute the method of controlling a node apparatus according to claim 17.

\* \* \* \* \*